US010568136B2

(12) United States Patent
Chou

(10) Patent No.: US 10,568,136 B2
(45) Date of Patent: Feb. 18, 2020

(54) METHOD AND APPARATUS FOR CONTROL PLANE AND USER PLANE TRANSMISSIONS IN A CUSTOMIZED C-RAN

(71) Applicant: FG Innovation Company Limited, Tuen Mun (CN)

(72) Inventor: Chie-Ming Chou, Zhubei (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 15/602,938

(22) Filed: May 23, 2017

(65) Prior Publication Data
US 2018/0343646 A1    Nov. 29, 2018

Related U.S. Application Data

(60) Provisional application No. 62/339,967, filed on May 23, 2016.

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC ........... H04W 72/046; H04W 74/0808; H04W 16/14; H04W 16/28; H04W 88/085
See application file for complete search history.

(56) References Cited

U.S. PATENT DOCUMENTS

| 9,043,467 | B2 | 5/2015 | Kovvali et al. | |
| 2004/0038713 | A1* | 2/2004 | Okawa | H04W 16/28 455/561 |
| 2011/0167170 | A1 | 7/2011 | Kovvali et al. | |
| 2013/0155847 | A1 | 6/2013 | Li et al. | |
| 2014/0269632 | A1* | 9/2014 | Blankenship | H04W 76/15 370/329 |
| 2015/0085797 | A1* | 3/2015 | Ji | H04J 3/16 370/329 |
| 2015/0110095 | A1 | 4/2015 | Tan et al. | |
| 2016/0029407 | A1* | 1/2016 | Soldati | H04W 52/0206 370/329 |
| 2016/0095003 | A1* | 3/2016 | Yu | H04W 16/28 370/311 |

(Continued)

FOREIGN PATENT DOCUMENTS

| CN | 102598628 A | 7/2012 |
| CN | 103636283 A | 3/2014 |

(Continued)

*Primary Examiner* — Ivan O Latorre
(74) *Attorney, Agent, or Firm* — ScienBiziP, PC

(57) ABSTRACT

A method for control-plane and user-plane transmissions in a customized C-RAN is disclosed. The method includes providing control-plane (CP) signaling using a first beam in a radio resource, and providing user-plane (UP) content using a second beam in the radio resource based on the CP signaling, wherein the first beam provides wider access coverage than the second beam. The radio resource is a licensed band or an unlicensed band. The first beam and the second beam are millimeter-wave beams. The first beam has an omni-directional beam pattern. The second beam has a directional beam pattern.

19 Claims, 14 Drawing Sheets

(56) References Cited

U.S. PATENT DOCUMENTS

| | | | |
|---|---|---|---|
| 2016/0099769 A1* | 4/2016 | Moffatt | H04B 7/18506 455/431 |
| 2016/0183242 A1* | 6/2016 | Cordeiro | H04W 16/32 370/331 |
| 2016/0211898 A1* | 7/2016 | Cai | H04B 7/0617 |
| 2017/0238233 A1* | 8/2017 | Oh | H04W 40/04 370/328 |
| 2017/0332362 A1* | 11/2017 | Li | H04W 72/0406 |
| 2017/0373737 A1* | 12/2017 | Liang | H04B 7/0617 |

FOREIGN PATENT DOCUMENTS

| | | |
|---|---|---|
| EP | 2854475 A1 | 4/2015 |
| WO | 2011115965 A1 | 9/2011 |
| WO | 2014000286 A1 | 1/2014 |

* cited by examiner

METHOD AND APPARATUS FOR CONTROL PLANE AND USER PLANE TRANSMISSIONS IN A CUSTOMIZED C-RAN

CROSS-REFERENCE TO RELATED APPLICATION(S)

The present application is related to provisional U.S. Patent Application Ser. No. 62/339,967 filed May 23, 2016, entitled "METHOD AND APPARATUS FOR CONTROL PLANE AND USER PLANE SIGNALING OF A MOBILE COMMUNICATION SYSTEM," invented by Chie-Ming Chou, (hereinafter referred to as "US59898 application"). The disclosure of the US59898 application is hereby incorporated fully by reference into the present application.

FIELD

The present application generally relates to wireless communications, and pertains particularly to method and apparatus for control plane and user plane transmission in a wireless communication system.

BACKGROUND

The $3^{rd}$ Generation Partnership Project (3GPP) is developing the architecture and protocols for the next generation wireless communication networks (e.g., new radio (NR)). An NR network strives to deliver sub-millisecond latency and at least 1 Gbps (e.g., 10 Gbps) downlink speed, and support millions or even billions of connections. In comparison, a $4^{th}$ Generation (4G) wireless network, such as a legacy long-term-evolution (LTE) network, can support at most 150 Mbps downlink speed with a single carrier. Thus, an NR network may have a system capacity that is 1000 times of the capacity of the current 4G wireless network. The NR exploits, among other things, higher frequencies of the radio spectrum in the millimeter wave range (e.g., 1 to 300 GHz), and dense small cell deployment (e.g., using picocells, baseband units, remote radio heads, and other techniques) to meet these technical requirements.

A cloud radio access network (C-RAN) can provide centralized baseband processing of a number of small cells. The C-RAN's abilities to coordinate among these small cells and pooling resources provide flexibility and efficiency to the wireless network architecture. For example, C-RANs may offer many benefits, such as (1) suitability for network function virtualization (NFV); (2) cost (e.g., CapEx, OpEx) reduction; (3) utilization and virtualization of radio resources to provide high system capacity and peak user equipment (UE) throughput; and (4) flexible adaption for different applications and requirements.

C-RANs also promise to support efficient transmission coordination and network function virtualization for the next generation of wireless communication networks. Under a C-RAN architecture, a baseband unit (BBU) can optimize the radio resource management (RRM) for connected remote radio heads (RRH), to satisfy various UE requirements (e.g., high throughput). In addition, massive multi-input-multi-output (M-MIMO) technology with millimeter wave (mmWave) frequency bands is also utilized to achieve high data rate.

However, a traditional C-RAN typically relies on one or more macro evolved node Bs (eNBs) or generation node Bs (gNBs) to cooperate with one or more RRHs for providing control plane (CP) signaling and user plane (UP) content (e.g., data) in order to achieve high throughput transmission in its coverage area. Such cooperation results in increased network overhead, and requires complex configurations on the UE end. As such, a traditional C-RAN may not be suitable and/or desirable for applications such as low cost internet of thing (IoT) devices, vendor factory enterprises, and hospital usage.

Thus, there is a need in the art for a customized C-RAN that can provide CP signaling and UP content without the deployment of network operators (e.g., macro eNBs), and provide a consistent access mechanism for standalone and non-standalone operations of RRHs.

BRIEF DESCRIPTION OF THE DRAWINGS

Aspects of the exemplary disclosure are best understood from the following detailed description when read with the accompanying Figures. Various features are not drawn to scale, dimensions of various features may be arbitrarily increased or reduced for clarity of discussion.

DETAILED DESCRIPTION

Figure 1:
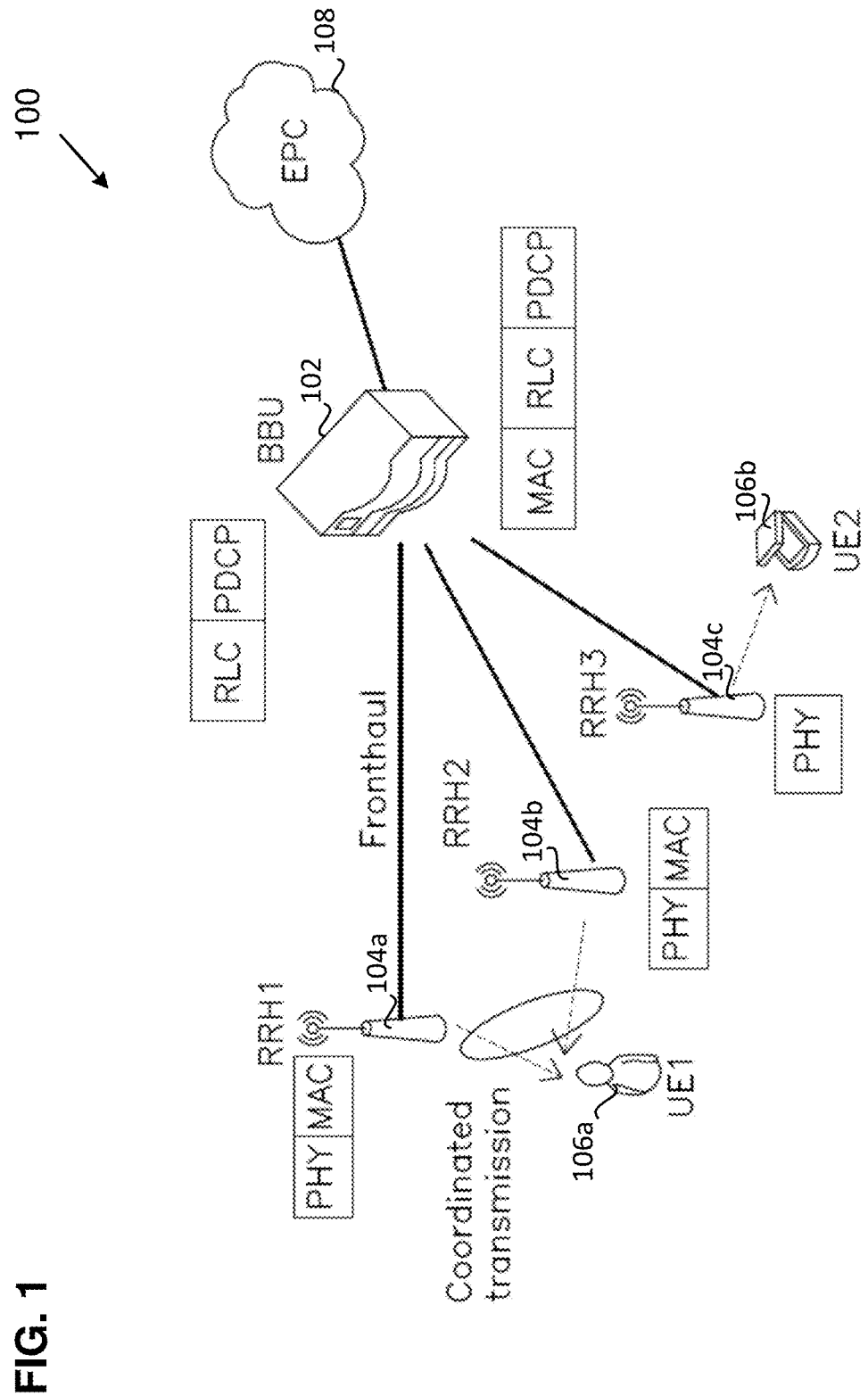
FIG. 1 is a schematic diagram illustrating a traditional C-RAN.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a schematic diagram illustrating a traditional C-RAN. As shown in FIG. 1, C-RAN 100 includes baseband unit (BBU) 102 (or sometimes referred to as central unit (CU)), remote radio heads (RRHs) 104a, 104b and 104c (or sometimes referred to as distributed unit (DU)), user equipments (UEs) 106a and 106b, and evolved packet core (EPC) 108. In one embodiment, C-RAN 100 is an LTE EPC network. In another embodiment, C-RAN 100 is a Next Generation Core (NG-C) network.

In C-RAN 100, BBU 102 manages a resources pool, and serves as a data gateway to connect EPC 108 with each of RRHs 104a, 104b and 104c. BBU 102 communicates with at least one of RRHs 104a, 104b and 104c through a fronthaul interface. For example, the fronthaul interface can be responsible for the transmission of IQ data between BBU 102 and the target RRH. Several transmission protocols (e.g., common public radio interface (CPRI), IEEE 1904.3) can facilitate reliable transmission in the fronthaul transport network. Also, in C-RAN 100, RRHs 104a, 104b and 104c are distributed in various geographic locations to provide radio access for UEs, such as UEs 106a and 106b.

In FIG. 1, C-RAN 100 can provide flexible functional splitting and transmission cooperation. For example, RRHs 104a and 104b can adopt joint processing to provide robust coordinated transmission to UE 106a. For transmission to UE 106a, both the physical layer (PHY) and the media access control (MAC) functionalities can be handled by (e.g., terminated at) the RRHs 104a and 104b, while the radio link control (RLC) and packet data convergence protocol (PDCP) functionalities are handled by BBU 102, to reduce access latency for UE 106a. In addition, UE 106b can run delay-tolerant services, while only the PHY functionality is handled by (e.g., terminated at) RRH 104c, while the MAC, RLC and PDCP functionalities are handled by BBU 102, to simplify RRH 104c's computing efforts.

Figure 2B:
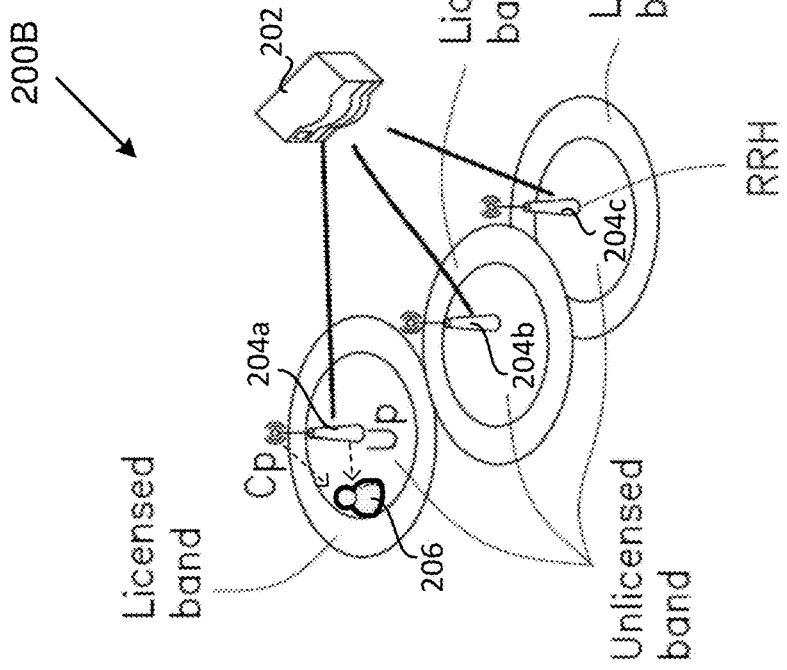
FIGS. 2A and 2B are schematic diagrams illustrating two traditional C-RAN deployment scenarios.
Figure 2A:
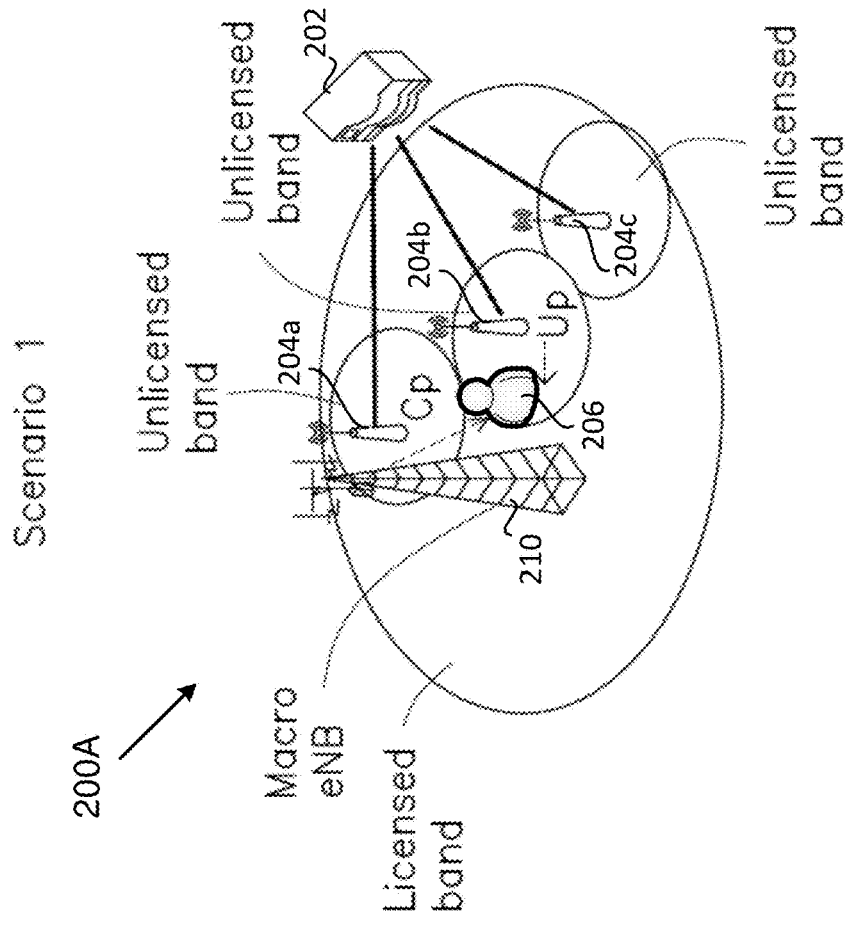

FIGS. 2A and 2B are schematic diagrams illustrating two traditional C-RAN deployment scenarios. As shown in FIG. 2A, C-RAN 200A includes BBU 202, RRHs 204a, 204b and 204c, macro eNB 210, and UE 206. In Scenario 1, C-RAN 200A relies on macro eNB 210 as an operator to cooperate with RRHs 204a, 204b and 204c. Macro eNB 210 is set up to allocate and assign licensed bands for transmission, and connect BBUs to a CN. Macro eNB 210 operates at a licensed band, and at least one of RRHs 204a, 204b and 204c operates at an unlicensed band. An unlicensed band is a sharing of spectrum with multiple transmitting entities/radio access technologies (RATs)/operators, where the sharing is subject to certain fairness criteria. In FIG. 2A, the entire C-RAN 200A's coverage overlaps with the coverage by macro eNB 210. Under Scenario 1, CP is managed by macro eNB 210. Consequently, UE 206 needs to associate with macro eNB 210 and use license-assisted access (LAA) to activate UP data transmission from and/or to RRHs 204a, 204b and 204c. For example, macro eNB 210 may use a licensed band to provide CP signaling to UE 206, while the UP content transmission is provided by RRH 204b using an unlicensed band.

BBU 202 manages an unlicensed band pool. BBU 202 may be connected to a core network (not explicitly shown in FIG. 2A), such as an EPC network. RRHs 204a, 204b and 204c need to perform a listen-before-talk (LBT) procedure to occupy unlicensed network resources (e.g., an unlicensed band) before any data transmission. By performing the LBT procedure, RRH 204b can avoid transmission collision with other entities in the unlicensed band. However, to guarantee fairness to all entities for unlicensed band usage, a single entity is prohibited from using an unlicensed band for continuous transmission even though the entity initially obtained the unlicensed band by passing the LBT procedure. Also, under Scenario 1, RRHs 204a, 204b and 204c may each limit their transmission power so as to prevent the transmission power from exceeding a predetermined threshold.

As shown in FIG. 2B, in Scenario 2, C-RAN 200B includes BBU 202, RRHs 204a, 204b and 204c, and UE 206. In Scenario 2, RRHs 204a, 204b and 204c can each operate at a licensed band and an unlicensed band simultaneously. In Scenario 2, the CP signaling is only transmitted via licensed bands, while the UP content can be transmitted via either licensed or unlicensed bands. UE 206 is associated with RRH 204a. When UE 206 needs high data rate transmission, LAA can be enabled in an unlicensed band if needed. Although, in Scenario 2, UE 206 is not associated with any macro eNB (e.g., single connectivity), C-RAN 200B requires increased RRH complexity, which means that the RRHs (e.g., RRHs 204a, 204b and 204c) need to support CP transmission with the capability to operate at a licensed band. RRHs 204a, 204b and 204c may operate at different licensed bands to avoid inter-cell interference. The different licensed bands may be configured by BBU 202. That is, BBU 202 manages the licensed and unlicensed band pool in Scenario 2, which results in increased network overhead.

The benefits of a traditional C-RAN may attract enterprises, such as factories and hospitals, to deploy C-RAN for their individual use. For instance, industry 4.0 describes a smart factory scenario where intelligent (automotive and Ethernet-connected) devices will be widely distributed in a factory to improve the product manufacturing process. However, the traditional C-RAN deployment scenarios described in FIGS. 2A and 2B are non-standalone deployments, which require operators and their efforts to manage the licensed spectrum for the deployments. Such deployments may be expensive and over-designed, which are not suitable for the particular needs of some enterprises. For example, most devices within an enterprise are relatively stationary or move relatively slow, which means that there is no high demand for mobile management control. Also, most devices are dedicated to data transmission, which means that there is no high demand for circuit-switching network. In addition, operators may charge license fees for using the licensed bands for CP transmissions. In addition, when RRHs adopt M-MIMO technology by using the mmWave spectrum, it is not feasible to provide CP signaling in one beam-forming direction (e.g., CP signaling being broadcast via a licensed band at one specific fixed direction).

Figure 3:
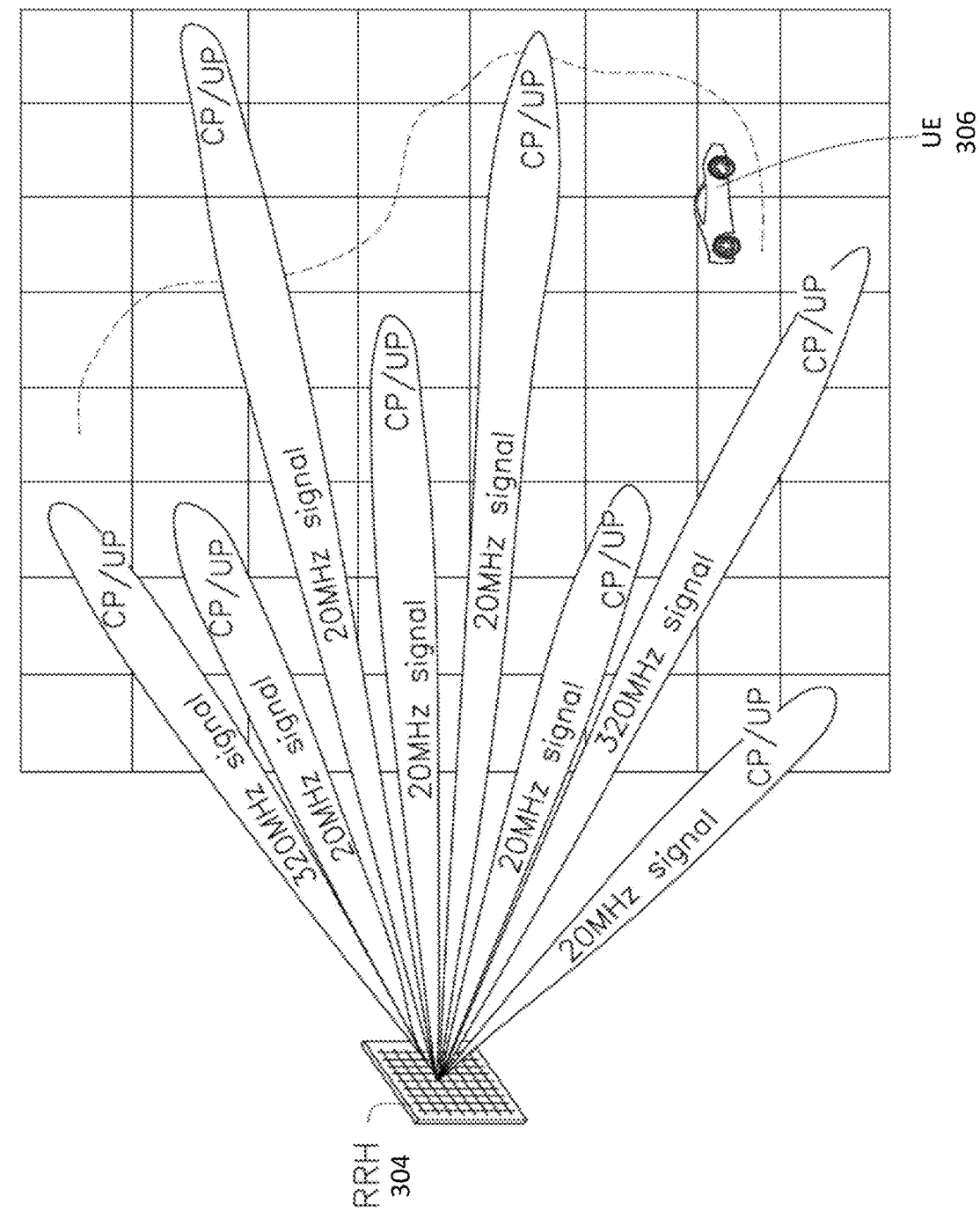
FIG. 3 is a schematic diagram illustrating an exemplary beam sweeping with a handover procedure in a traditional C-RAN.

FIG. 3 is a schematic diagram illustrating an exemplary beam sweeping with a handover procedure in a traditional C-RAN. In FIG. 3, C-RAN 300 includes RRH 304 and UE 306. RRH 304 provides multiple narrow beams in same or different frequency bands, where each narrow beam provides both CP signaling and UP content. When UE 306 is moving and switching from one beam-forming direction to another, RRH 304 needs to initiate a beam management procedure to change UE 306's association to acquire the appropriate CP signaling information. The beam management procedure can be done by a BBU (not explicitly shown in FIG. 3) alone, by RRH 304 alone, or by a cooperation between the BBU and RRH 304. However, the beam management procedure can result in a huge increase in network overhead, thereby degrading the system performance. Additionally, if a beam-tracking approach is applied, where the beam-forming direction automatically changes as UE 306 moves, it will introduce high computing complexity (e.g., UE 306's migration needs to be traced and the beam-forming weighting parameters need to be immediately reconfigured), which can also degrade the system capacity (e.g., one beam only serves one UE since multiple UEs may have different trajectories).

Furthermore, the CP signaling information contained in two or more of the narrow beams may include at least partially if not entirely identical information. If all of the narrow beams operate in unlicensed bands, transmitting redundant CP signaling information using the unlicensed spectrum may waste the spectrum resources. Also, if RRH 304 operates in unlicensed bands, RRH 304 needs to perform LBT for each beam before transmitting CP signaling information to the respective UEs. Another problem arises when two or more beams may perform LBT to the same unlicensed band at the same time. For example, two or more beams, attempting to transmit CP signaling information, each perform LBT at the same time, they may test the same unlicensed band (i.e., channel) at the same time, and all determine the channel is clear. However, if all of the beams decide to use this channel, the CP signaling information from these beams would collide with one another.

Figure 4:
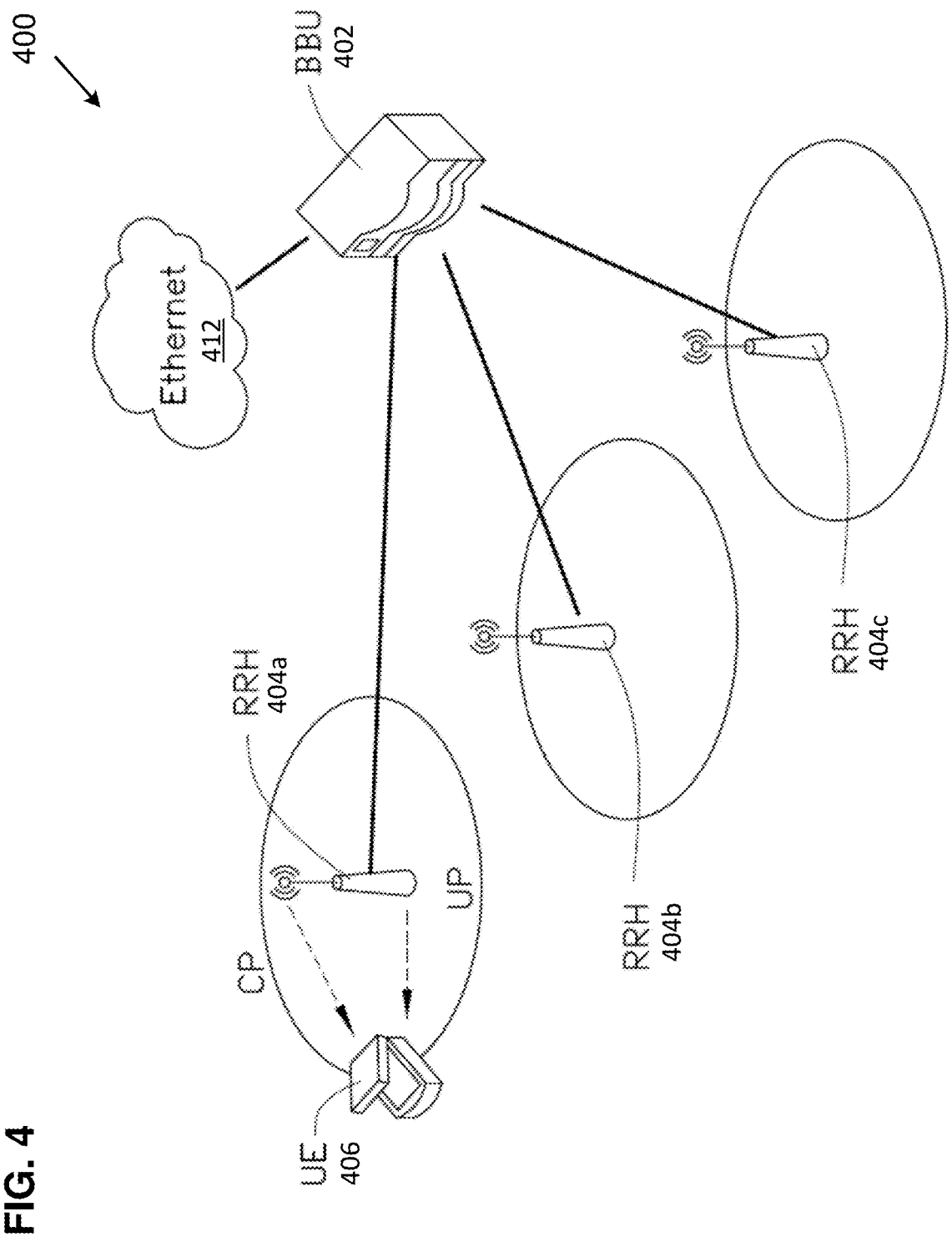
FIG. 4 is a schematic diagram illustrating an exemplary customized C-RAN deployment, according to an exemplary embodiment of the present application.

FIG. 4 is a schematic diagram illustrating an exemplary customized C-RAN deployment, according to an exemplary embodiment of the present application. In FIG. 4, customized C-RAN 400 includes BBU 402, RRHs 404a, 404b and 404c, and UE 406. It is noted that BBU 402 is connected to Ethernet 412 directly, without an operator, for "plug-and-play" operation.

In one exemplary embodiment, RRHs 404a, 404b and 404c operate in unlicensed bands to provide CP signaling and UP content to its serving UEs. Since RRHs 404a, 404b and 404c operate under unlicensed bands, no fee for using licensed bands is required. Also, heterogeneous network operation can be avoided since macro eNB plays no role in the present exemplary customized C-RAN deployment. The cost of the present exemplary customized C-RAN deployment can be reduced and the UEs' operations can be simplified. In another exemplary embodiment, customized C-RAN 400 may be operated at licensed bands when the enterprise owner chooses to rent or borrow the licensed bands from an operator. For example, RRH 404a may provide CP signaling to UE 406 using a CP beam in a sub-band of the licensed radio spectrum. RRH 404a may also provide UP content to UE 406 using one or more UP beams in other sub-bands of the licensed radio spectrum. In another exemplary embodiment, RRH 404a may provide UP content to UE 406 using one or more UP beams in separate time slots with the same sub-band.

With customized C-RAN 400's infrastructure and adaptation to M-MIMO technology using the mmWave spectrum, customized C-RAN 400 can be utilized for a variety of scenarios to support a massive number of connections and ubiquitous coverage at a much lower cost. In the present exemplary embodiment, RRH 404a provides CP signaling to UE 406 using a CP beam in a sub-band of an unlicensed radio spectrum. RRH 404a also provides UP content to UE 406 using one or more UP beams in other sub-bands of the unlicensed radio spectrum.

As discussed with reference to FIG. 5 below, the CP beam for providing CP signaling is wider than the UP beams for providing UP content to the UEs. That is, the CP beams provide wider access coverage than the UP beams. In the present exemplary embodiment, RRH 404a may provide (e.g., broadcast) a CP beam having an omni-directional beam pattern, and provide one or more UP beams with narrower directional beam patterns to transmit UP content (e.g., data) to UE 406. In another exemplary embodiment, RRH 404a may provide one or more CP beams having wider directional beam patterns, and provide one or more UP beams with narrower directional beam patterns to transmit UP content to UE 406 respectively, where each of the wider directional beam patterns may overlap with several narrow directional beam patterns. That is, the CP beams provide wider access coverage than the UP beams.

In the case where CP signal information is provided by a licensed sub-band, RRHs 404a, 404b and 404c may each broadcast their corresponding CP signaling by using dedicated resources (i.e., without performing LBT). RRHs 404a, 404b and 404c may each provide hybrid beam-forming functionality to resolve the problem of excessive overhead for UE migration. For example, each of RRHs 404a, 404b and 404c may use a portion of the antennas in its antenna array to form a CP beam having an omni-directional beam pattern whose coverage encompasses the coverage of all of the UP beams having directional beam patterns, where the directional beam patterns are generated by the other antennas in the antenna array. RRHs 404a, 404b and 404c may each allocate one specific licensed sub-band from the total available bandwidth (e.g., 20 MHz from 160 MHz) as the CP operating band for the omni-directional beam pattern. As the CP beam with the omni-directional beam pattern is anchored at a specific licensed band, the UP beams may switch operating sub-band, bandwidth and direction through beam-forming. For example, a UE may establish RRC connection with an RRH through an omni-directional beam in a licensed CP operating sub-band, and the RRH may transmit data to the UE by using a directional beam in a licensed or an unlicensed sub-band.

In the case where CP signal information is provided by an unlicensed sub-band, RRHs 404a, 404b and 404c can each provide (e.g., broadcast) their corresponding CP signaling using an omni-directional beam in an unlicensed CP operating sub-band. Each of RRHs 404a, 404b and 404c may perform LBT before providing (e.g., broadcasting) their respective CP beams in their specific unlicensed sub-bands. RRHs 404a, 404b and 404c may each provide hybrid beam-forming functionality to resolve the problem of excessive overhead for UE migration. For example, each of RRHs 404a, 404b and 404c may use a portion of the antennas in its antenna array to form a CP beam having an omni-directional beam pattern whose coverage encompasses the coverage of all of the UP beams having directional beam patterns, where the directional beam patterns are generated by the other antennas in the antenna array. RRHs 404a, 404b and 404c may each allocate a specific unlicensed sub-band from the total available bandwidth (e.g., 20 MHz from 160 MHz) as the CP operating sub-band for the omni-directional beam pattern. As the CP beam with the omni-directional beam pattern is anchored at a specific unlicensed sub-band, the UP beams may switch operating sub-band, bandwidth and direction through beam-forming. For example, a UE may establish RRC connection with an RRH through an omni-directional beam in an unlicensed CP operating sub-band, and the RRH may transmit data to the UE by using a directional beam in an unlicensed sub-band. In another embodiment, the RRH may transmit UP data to the UE by using a directional beam in a licensed sub-band.

It should be understood that the CP beam's beam pattern does not need to be omni-directional. The CP beam may have a beam pattern (e.g., non-omni-directional beam pattern) having a beamwidth that is wider (e.g., having wider access coverage) than the beamwidths of all of the UP beams under the RRH's coverage. In addition, UP content can be transmitted to UE 406 through different UP beams in different time slots within the same sub-band.

Figure 5:
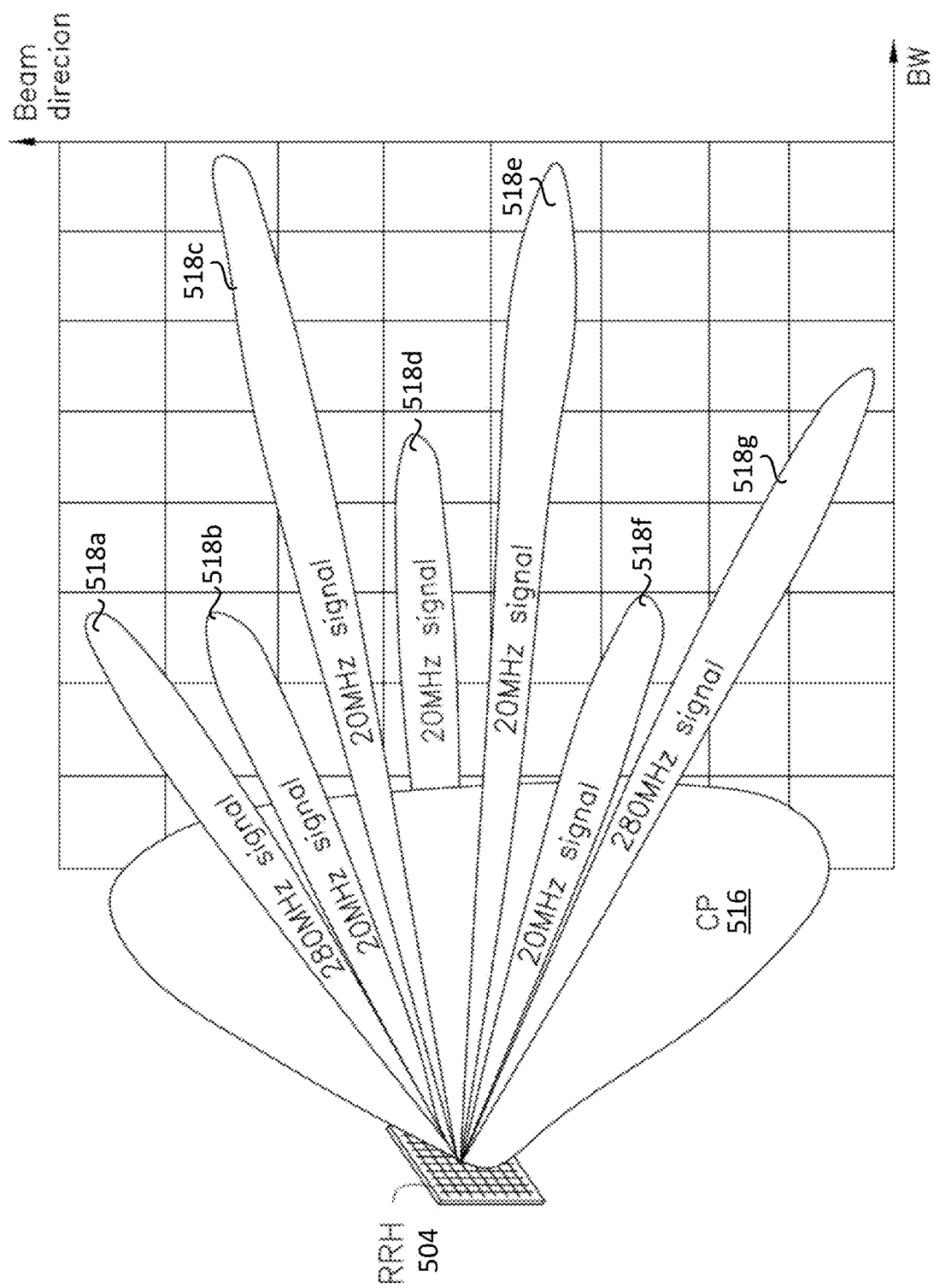
FIG. 5 is a schematic diagram illustrating an exemplary hybrid beam-forming RRH, according to an exemplary embodiment of the present application.

FIG. 5 is a schematic diagram illustrating an exemplary hybrid beam-forming RRH, according to an exemplary embodiment of the present application. As shown in FIG. 5, RRH 504 can form eight beams with different beam patterns. The CP information (e.g., control channel and signaling) is transmitted via CP beam 516 having an omni-directional beam pattern (to cover all eight vertical grids) with a 20 MHz bandwidth (e.g., as shown along the horizontal axis). UP beams 518a, 518b, 518c, 518d, 518e, 518f, and 518g provide the UP content in their dedicated directions with flexible bandwidth allocation. UP beams 518a, 518b, 518c, 518d, 518e, 518f, and 518g may each have their own bandwidths, for example, adjusted based on their particular serving UEs' UL/DL requirements. For example, UP beam 518a has a bandwidth of 280 MHz, while UP beam 518b has a bandwidth of 20 MHz. The bandwidth of each UP beam may depend on the data transmission rate required by the UE being served. It should be noted that, a portion of the CP operating sub-band may also be allocated for data transmission without the directional beam-forming benefits (e.g., resulting in low rates of data transmission).

In the present exemplary embodiment, RRH 504 may include an antenna array and associated beam-forming circuit to provide CP signaling through CP beam 516 in a sub-band of an unlicensed radio spectrum. RRH 504 may also provide UP content using one or more UP beams 518a, 518b, 518c, 518d, 518e, 518f, and 518g through other sub-bands of the unlicensed radio spectrum.

In FIG. 5, CP beam 516 has an omni-directional beam pattern, while each of UP beams 518a, 518b, 518c, 518d, 518e, 518f, and 518g has a directional beam pattern. As illustrated in FIG. 5, the beam pattern of CP beam 516 is wider than each of the beam patterns of UP beams 518a, 518b, 518c, 518d, 518e, 518f, and 518g. That is, CP beam 516 provides wider access coverage than UP beams 518a, 518b, 518c, 518d, 518e, 518f, and 518g.

CP beam 516 includes all the necessary information (e.g., synchronization signaling, system information, reference signaling, and channel configuration) for all of the UP beams under RRH 504's coverage. As such, all UEs in the coverage of RRH 504 may synchronize with RRH 504 based on CP information provided by CP beam 516 for subsequent UP (e.g., DL/UL) transmission through one or more UP beams 518a, 518b, 518c, 518d, 518e, 518f, and 518g. That is, UP beams 518a, 518b, 518c, 518d, 518e, 518f, and 518g all rely on CP beam 516 for providing all the necessary information for their subsequent data transmission.

From a UE's perspective, the UE may include a transceiver circuit for acquiring the CP signaling through the CP operating sub-band to perform DL/UL synchronization and establishing an RRC connection with RRH 504, when the UE moves into RRH 504's coverage. After successfully establishing an RRC connection, when high data transmission is required, RRH 504 may schedule data transmission by using one or more directional UP beams (e.g., UP beams 518a, 518b, 518c, 518d, 518e, 518f, and 518g) and the corresponding resources based on the UE's relative measurements (e.g., based on the UE's location). The transceiver circuit of the UE may acquire user data through one or more directional UP beams (e.g., UP beams 518a, 518b, 518c, 518d, 518e, 518f, and 518g). Notwithstanding migration within RRH 504's coverage, the UE can still receive the CP signaling due to the omni-directional CP beam 516 covering all UP beams from RRH 504. Thus, no handover procedure is required when the UE moves within the coverage of RRH 504.

Figure 6:
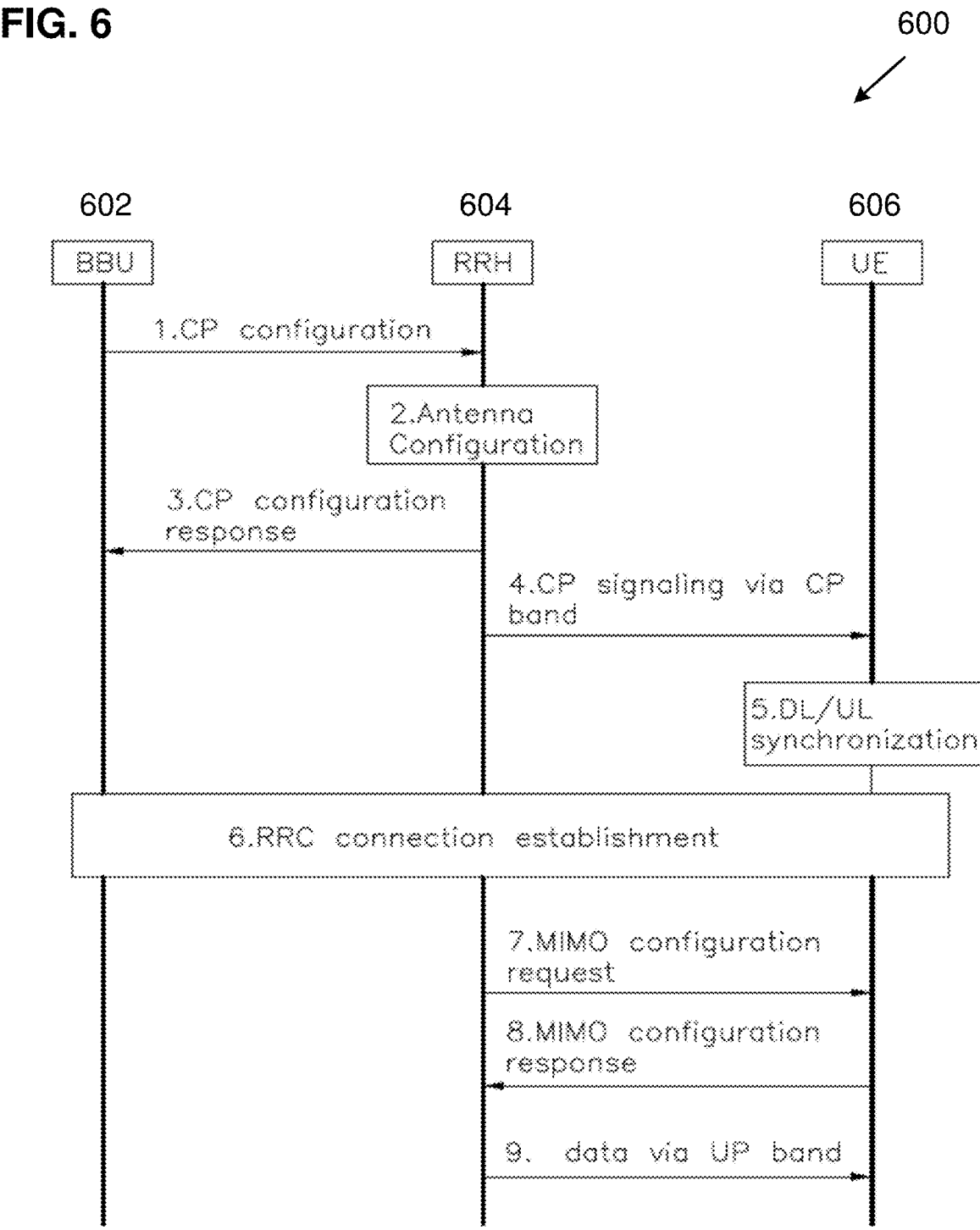
FIG. 6 is a schematic diagram illustrating an exemplary signaling procedure to support CP signaling and UP content transmission via the hybrid beam-forming RRH shown in FIG. 5, according to an exemplary embodiment of the present application.

FIG. 6 is a schematic diagram illustrating an exemplary signaling procedure to support CP signaling and UP content transmission via the hybrid beam-forming RRH shown in FIG. 5, according to an exemplary embodiment of the present application. As illustrated in FIG. 6, signaling procedure 600 includes steps 1 through 9. In step 1, BBU 602 sends a CP configuration message to RRH 604. The CP configuration message may include the assigned CP operating sub-band or the assigned CP operating time slot and describe the parameters of an omni-directional beam-forming pattern (e.g., the transmission power, the beam-forming weights, and the phase) of a CP beam (e.g., CP beam 516 in FIG. 5). In step 2, after receiving the CP configuration message, RRH 604 configures at least a portion of its antenna array based on the parameters for the requested omni-directional beam-forming pattern in the assigned CP operating sub-band or in the assigned CP operating time slot. In step 3, after antenna configuration, RRH 604 sends a CP configuration response message to BBU 602 to inform BBU 602 about the status of the configuration (e.g., success or failure). RRH 604 may further indicate the cause of failure in the CP configuration response message in order for BBU 602 to perform re-configuration if necessary. Both the CP re-configuration request and CP re-configuration response messages may be transmitted through open radio equipment interface (ORI) or other network interface protocol (GPRS tunneling protocol control plane data (GTP-C plane data)).

As shown in FIG. 6, in step 4, after successful antenna configuration, RRH 604 provides (e.g., by broadcasting) CP signaling using the CP beam that has the omni-directional beam pattern (e.g., CP beam 516 in FIG. 5). In step 5, UE 606 (e.g., either idle or entering the coverage of RRH 604) may acquire the CP signaling and perform DL/UL synchronization based on the information (e.g., synchronization signaling, system information, reference signaling, and channel configuration) contained in the CP beam. In step 6, once synchronization with RRH 604 is accomplished, UE 606 performs RRC connection establishment (e.g., registration/authorization, NAS negotiation) through RRH 604. UE 606 may proceed with the legacy establishment. For example, a transferring function may be located in BBU 602 to deal with the establishment (e.g., transferring the legacy establishment to an IP packet and forwarding directly to the Ethernet since the customized C-RAN does not connect with an EPC).

As further shown in FIG. 6, in step 7, when UE 606 requests high data rate transmission, RRH 604 may perform directional beam-forming (e.g., by applying appropriate weighting based on measurements of UE 606) and send a M-MIMO beam-forming configuration request message to UE 606. The M-MIMO beam-forming configuration request message may include the allocated bands, the allocated time slots and relative M-MIMO parameters for forming a directional UP beam. In step 8, after receiving the M-MIMO beam-forming configuration request message, UE 606 may adopt the transmission mode, for example, by activating additional RF/antenna modules based on the allocated sub-bands and or the allocated time slots). Then, UE 606 replies an acknowledgement (ACK) or a non-acknowledgement (NACK) message by using a M-MIMO beam-forming configuration response message. In step 9, when RRH 604 receives the M-MIMO beam-forming configuration response message (e.g., ACK) from UE 606, RRH 604 may schedule data on the allocated sub-band or the allocated time slot and form a directional UP beam for transmitting UP content (e.g., data) to UE 606.

Signaling procedure 600 under a customized C-RAN according to the present exemplary embodiment may apply to transmitting CP signaling and UP content in either licensed or unlicensed sub-bands. It should be noted that, for transmitting CP signaling and UP content using unlicensed sub-bands, RRH 604 may need to perform LBT before transmitting CP signaling to UE 606, and before transmitting UP content to UE 606.

Figure 7:
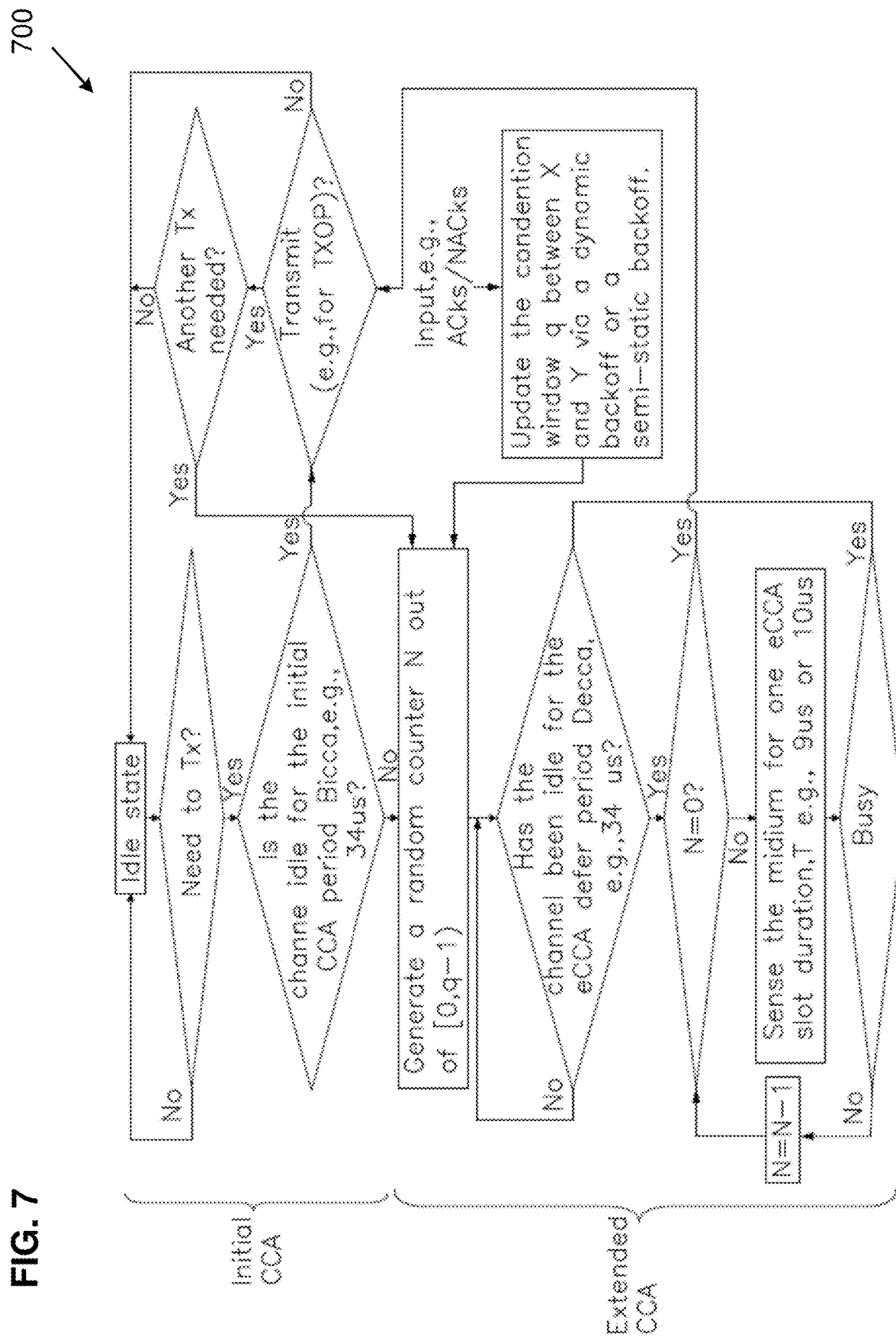
FIG. 7 is a schematic diagram illustrating an exemplary Listen-Before-Talk (LBT) procedure in a customized C-RAN deployment, according to an exemplary embodiment of the present application.

FIG. 7 is a schematic diagram illustrating an exemplary Listen-Before-Talk (LBT) procedure in a customized C-RAN deployment, according to an exemplary embodiment of the present application. In the present exemplary embodiment, LBT procedure 700 may be performed when a RRH under a customized C-RAN of the present application attempts to transmit CP signaling and/or UP content using an unlicensed sub-band. LBT procedure 700 requires the RRH to perform a clear channel assessment (CCA) to determine if the unlicensed sub-band is free for use. For example, if the RRH detect energy in the unlicensed sub-band is greater than an energy detection threshold, the RRH may deem the unlicensed sub-band to be occupied (i.e., not free for use). In LBT procedure 700, a transmitting entity (e.g., an RRH) draws a random number N within a contention window. The size of the contention window is specified by the minimum and maximum value of N. The transmitting entity can vary the size of the contention window when drawing the random number N. The random number N is used in the LBT procedure to determine the sensed duration of time that the channel is idle before the transmitting entity transmits on the channel.

According to the principles of LBT, only one RRH can occupy the resources (e.g., a sub-band or channel) for CP and/or UP transmission. Based on this principle, conflict or contention resources among multi-beams (within the same RRH), or between RRHs (within the same C-RAN), may result in degradation of the system's performance, if there is no suitable coordination among the RRHs. For example, if an RRH and its neighboring RRHs need to broadcast synchronization signaling at the same time, and all perform LBT with respect to the same resources (e.g., a sub-band or channel) without any coordination among them, then transmission collision may occur. To avoid intra- and inter-RRH beam collisions, three LBT procedures will be described below in detail.

Figure 8:
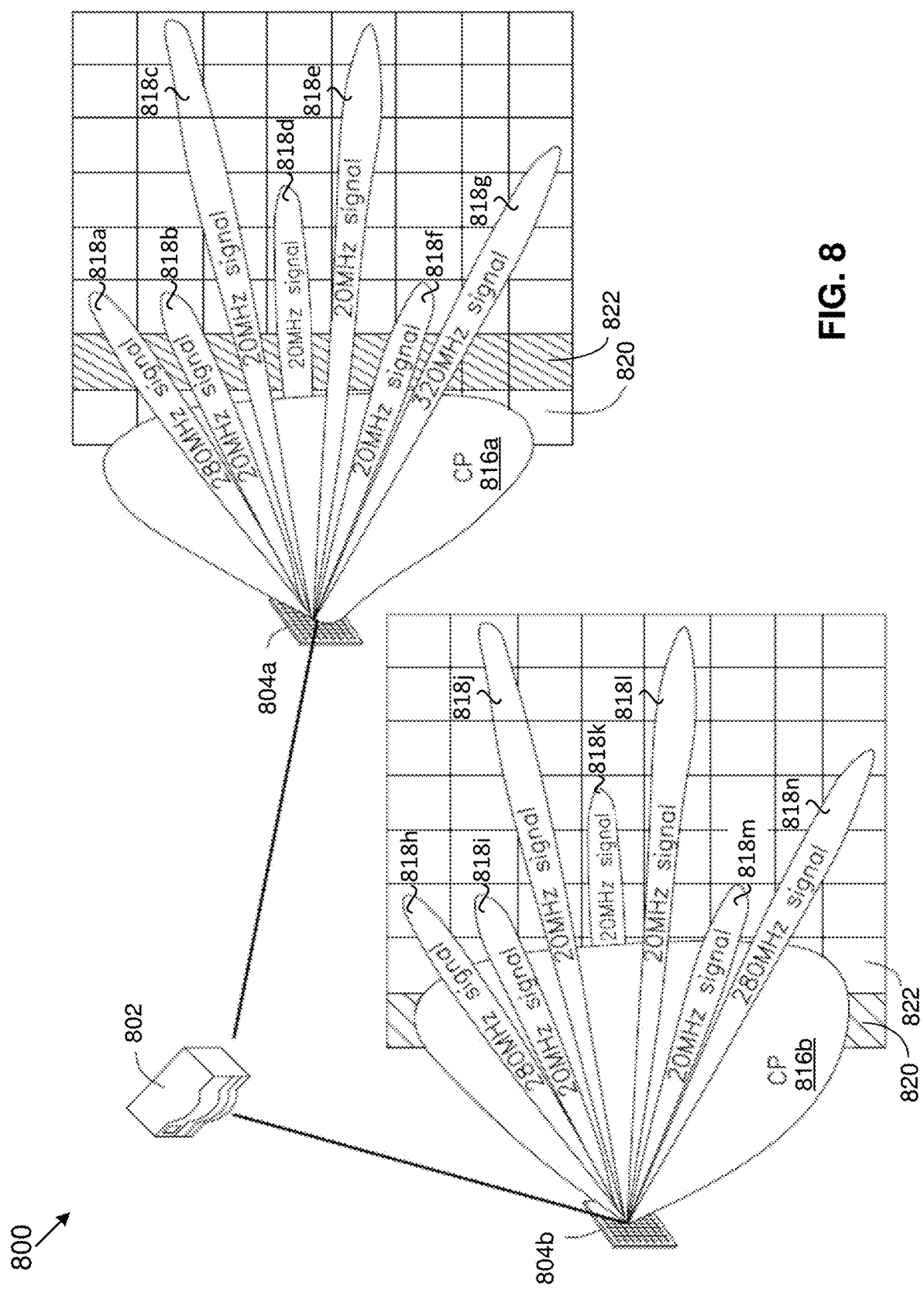
FIG. 8 is a schematic diagram illustrating a customized C-RAN adopting a coordinated LBT procedure, according to an exemplary embodiment of the present application.

FIG. 8 is a schematic diagram illustrating a customized C-RAN adopting a coordinated LBT procedure, according to an exemplary embodiment of the present application. In FIG. 8, customized C-RAN 800 includes BBU 802, RRH 804a, and RRH 804b. BBU 802 communicates with RRHs 804a and 804b. RRHs 804a and 804b can administer their own individual CP and UP transmissions. In one exemplary embodiment, frequency division modulation (FDM) is adopted between RRHs 804a and 804b to make sure that RRHs 804a and 804b perform their LBT procedures in different sub-bands to avoid potential intra- and inter-RRH beam collisions or conflicts. In another exemplary embodiment, time division modulation (TDM) may be adopted between RRHs 804a and 804b to make sure that RRHs 804a and 804b perform their LBT procedures in their respective time slots in the same sub-band to avoid potential intra- and inter-RRH beam collisions or conflicts.

As illustrated in FIG. 8, RRH 804a and RRH 804b select unlicensed sub-band 820 and sub-band 822, respectively, for their CP signaling transmission. That is, before RRH 804a attempts to provide CP signaling to UEs under its coverage using sub-band 820, RRH 804a performs LBT to check if sub-band 820 is free for use. Similarly, before RRH 804b attempts to provide CP signaling using sub-band 822, RRH 804b performs LBT to check if sub-band 822 is free for use. It is noted that, in the present exemplary embodiment, RRH 804a and RRH 804b perform LBT at the same time since their respective LBT procedures are performed with respect to different sub-bands. By using separate sub-bands, customized C-RAN 800 can avoid resources conflict among the connected RRHs (e.g., RRH 804a and RRH 804b).

In the present exemplary embodiment, RRH 804a is prohibited from using sub-band 822 for its UP content transmission (as depicted by the slash lines in FIG. 8), when the detected energy or RSSI from RRH 804b upon sub-band 822 is larger than a predetermined threshold, which indicates that RRH 804b is currently using sub-band 822. Likewise, RRH 804b is prohibited from using sub-band 820 for its UP content transmission (as depicted by the slash lines in FIG. 8), when the detected energy or RSSI from RRH 804a upon sub-band 820 is larger than a predetermined threshold, which indicates that RRH 804a is currently using sub-band 820.

The CP sub-bands for CP beams 816a and 816b may occupy smaller bandwidths (e.g. around 10 MHz) than the bandwidths of the sub-bands occupied by UP beams 818a through 818n (e.g., from 20-320 MHz). It is noted that UP beams 818a through 818n may each have their own bandwidths, for example, adjusted based on their particular serving UEs' UL/DL requirements. For example, UP beam 818a has a bandwidth of 280 MHz, while UP beam 818m has a bandwidth of 20 MHz. The bandwidth of each UP beam may depend on the data transmission rate required by the UE being served. RRHs 804a and 804b may apply different levels of transmitting power for their respective CP transmissions.

In the present embodiment, CP beam 816a includes all the necessary information (e.g., synchronization signaling, system information, reference signaling, and channel configuration) for the UP beams under RRH 804a's coverage. As such, all UEs in the coverage of RRH 804a may synchronize with RRH 804a based on CP information provided by CP beam 816a for subsequent UP content (e.g., DL/UL) transmission through one or more UP beams 818a, 818b, 818c, 818d, 818e, 818f, and 818g. That is, UP beams 818a, 818b, 818c, 818d, 818e, 818f, and 818g all rely on CP beam 816a for providing all the necessary information for their subsequent UP data transmissions.

Similarly, CP beam 816b includes all the necessary information (e.g., synchronization signaling, system information, reference signaling, reference signal configuration and channel configuration) for the UP beams under RRH 804b's coverage. As such, all UEs in the coverage of RRH 804b may synchronize with RRH 804b based on CP information provided by CP beam 816b for subsequent UP content (e.g., DL/UL) transmission through one or more UP beams 818h, 818i, 818j, 818k, 818l, 818m, and 818n. That is, UP beams 818h, 818i, 818j, 818k, 818l, 818m, and 818n all rely on CP beam 816b for providing all the necessary information for their subsequent UP data transmissions.

It should be understood that beam patterns of CP beams 816a and 816b do not need to be omni-directional. For example, CP beam 816*a* may have a beam pattern (e.g., non-omni-directional beam pattern) having a beamwidth that is wider (e.g., wider access coverage) than the beamwidths of all of UP beams 818*a*, 818*b*, 818*c*, 818*d*, 818*e*, 818*f*, and 818*g* under RRH 804*a*'s coverage. Similarly, CP beam 816*b* may have a beam pattern (e.g., non-omni-directional beam pattern) having a beamwidth that is wider (e.g., wider access coverage) than the beamwidths of all of UP beams 818*h*, 818*i*, 818*j*, 818*k*, 818*l*, 818*m*, and 818*n* under RRH 804*b*'s coverage.

From a UE's perspective, as the UE entering the coverage of customized C-RAN 800, the UE will read the CP signaling information from both RRH 804*a* and RRH 804*b*. The UE may decide to camp on RRH 804*a* or RRH 804*b* based on the relative location of the UE to RRH 804*a* and RRH 804*b* or the relative received signal quality to RRH 804*a* and RRH 804*b*, and the information contained in CP beams 816*a* and 816*b*.

In the present exemplary embodiment, BBU 802 is a central unit that can provide coordination of CP signaling transmission between RRH 804*a* and RRH 804*b*. Based on the received CP configuration from BBU 802, each of RRH 804*a* and RRH 804*b* may know with respect to which sub-band or time slot it should perform their LBT procedures, and what the time duration it needs to cover. RRH 804*a* and RRH 804*b* may also configure their respective the antenna arrays, and respond back to the BBU.

If the particular sub-band the RRH (e.g., RRH 804*a* or RRH 804*b*) attempts to transmit CP signaling information in is occupied, the RRH may attempt to switch to a different CP sub-band (e.g., either by indications from BBU 802 or the RRH itself), and send the switching message to all of its connected UEs to notify the UEs about the change. Consequently, the connected UEs may try to re-synchronize with the new CP sub-band and resume CP connection as soon as possible. The RRH may indicate a time period for the UEs to achieve re-synchronization before the time period expires.

Figure 9:
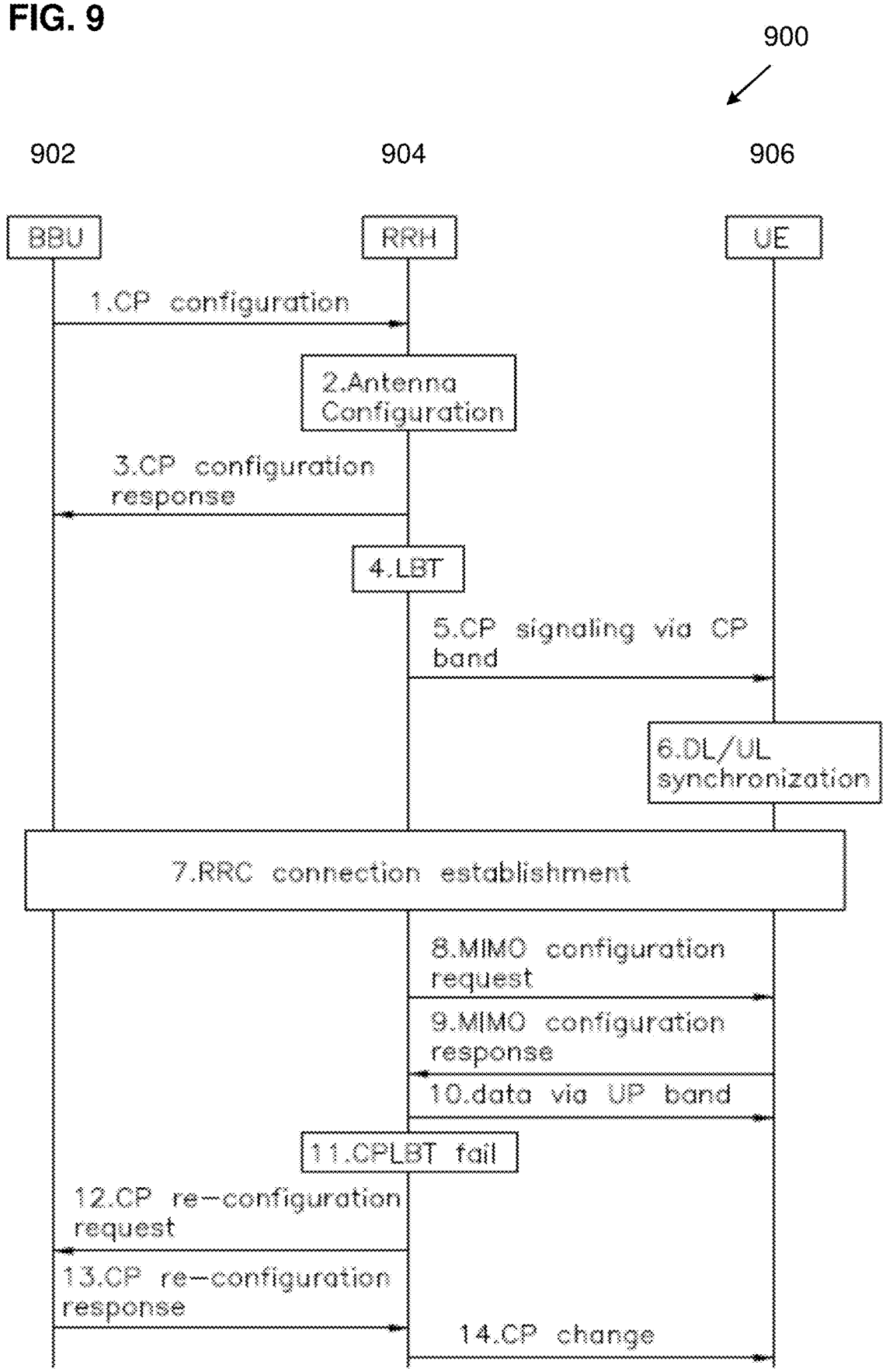
FIG. 9 is a schematic diagram illustrating an exemplary signaling procedure for a customized C-RAN adopting a coordinated LBT procedure, according to an exemplary embodiment of the present application.

FIG. 9 is a schematic diagram illustrating an exemplary signaling procedure for a customized C-RAN adopting a coordinated LBT procedure, according to an exemplary embodiment of the present application. As illustrated in FIG. 9, signaling procedure 900 includes steps 1 through 14. In step 1, BBU 902 sends a CP configuration message to RRH 904. The CP configuration message may include the assigned CP operating sub-band, the assigned CP operating time slot and describe the parameters of an omni-directional beam-forming pattern (e.g., the transmission power, the beam-forming weights, and the phase) of a CP beam (e.g., CP beam 816*a* or CP beam 816*b* in FIG. 8). In step 2, after receiving the CP configuration message, RRH 904 configures at least a portion of its antenna array based on the parameters for the requested omni-directional beam-forming pattern in the assigned CP operating sub-band. In step 3, after antenna configuration, RRH 904 sends a CP configuration response message to BBU 902 to inform BBU 902 about the status of the configuration (e.g., success or failure). RRH 904 may further indicate the cause of failure in the CP configuration response message in order for BBU 902 to perform re-configuration if necessary. Both the CP re-configuration request and CP re-configuration response messages may be transmitted through open radio equipment interface (ORI) or other network interface protocol (GPRS tunneling protocol control plane data (GTP-C plane data)). Although there is only one RRH 904 shown in FIG. 9, it should be understood that, in the present exemplary embodiment, BBU 902 is a central unit that can provide coordination of CP transmission among multiple RRHs. Based on the received CP configuration from BBU 902, each of the RRHs (including RRH 904) may know with respect to which sub-band they should perform the LBT procedure, and what the time duration they need to cover. So, the RRHs may configure their antennas, and respond back to BBU 902.

In step 4, RRH 904 performs LBT before providing any CP signaling through a CP beam in an unlicensed sub-band to make sure that the unlicensed sub-band (e.g., channel) is not occupied. In step 5, after performing LBT, if the unlicensed sub-band RRH 904 attempts to transmit CP signaling in is free for use (or unoccupied), RRH 904 may provide CP signaling using the CP beam that has the omni-directional beam pattern through the omni-directional beam-forming antenna configuration. In step 6, UE 906 (e.g., either idle or entering the coverage of RRH 904) may acquire the CP signaling through a transceiver circuit, and perform DL/UL synchronization based on the information (e.g., synchronization signaling, system information, reference signaling, and channel configuration) contained in the CP beam. It should be noted that, UE 906 may receive CP signaling from multiple RRHs at different sub-bands. UE 906 may decide which RRH to camp on based on the information contained in each of the CP beams and the relative location/received signal quality of UE 906 to each of the RRHs. In the present embodiment, UE 906 decides to camp on RRH 904 for subsequent UP content transmission, after comparing all of the CP beams (e.g., CP beams 816*a* and 816*b* in FIG. 8) it has received.

In step 7, once synchronization with RRH 904 is accomplished, UE 906 performs RRC connection establishment (e.g., registration/authorization, NAS negotiation) through RRH 904. UE 906 may proceed with the legacy establishment. For example, a transferring function may be located in BBU 902 to deal with the establishment (e.g., transferring the legacy establishment to an IP packet and forwarding directly to the Ethernet since the customized C-RAN does not connect with an EPC). As a result of step 7, an RRC connection is established among BBU 902, RRH 904 and UE 906. In step 8, when UE 906 requests UP content transmission, RRH 904 may perform directional beam-forming (e.g., by applying appropriate weighting based on measurements of UE 906) and send a M-MIMO beam-forming configuration request message to UE 906. The M-MIMO beam-forming configuration request message may include the allocated bands and relative M-MIMO parameters for forming a directional UP beam.

In step 9, after receiving the M-MIMO beam-forming configuration request message, UE 906 may adapt the transmission mode, for example, by activating additional RF/antenna modules based on the allocated sub-bands). Then, UE 906 replies an acknowledgement (ACK) or a non-acknowledgement (NACK) message by using a M-MIMO beam-forming configuration response message. In step 10, when RRH 904 receives the M-MIMO beam-forming configuration response message (e.g., ACK) from UE 906, RRH 904 may schedule UP content on the allocated sub-band and form a directional UP beam for transmitting UP content (e.g., data) to UE 906, where the transceiver circuit of UE 906 receives the UP content using the directional UP beam based on the CP signaling information acquired through the CP beam. It should be noted that, a LBT procedure may be required between step 9 and step 10 to ensure that the particular sub-band RRH 904 attempts to transmit UP content in is free for use (or unoccupied). If after the LBT procedure, RRH 904 determines that the particular sub-band is unoccupied, then RRH 904 may provide UP content using the UP beam that has a directional beam pattern.

In step 11, the LBT procedure for CP signaling transmission determines that the particular sub-band in which RRH 904 attempts to transmit the CP signaling is in use or occupied, thereby failing to pass the LBT. In step 12, RRH 904 sends a CP re-configuration request to BBU 902. BBU 902 may assign another sub-band as a new CP sub-band, and send the re-configuration to RRH 904 using a CP re-configuration response in step 13. Both the CP re-configuration request and CP re-configuration response may be transmitted through open radio equipment interface (ORI) or other network interface protocol. In step 14, RRH 904 may send a CP changing command to all of the UEs under its coverage to request CP sub-band switching. The command may be transmitted by using a dedicated RRC message or MAC control element (MAC CE) through the directional beam-forming transmission. When the UEs, including UE 906, receive the CP sub-band changing command, the UEs may perform re-synchronization with regard to the new CP sub-band, and resume the CP reception. It should be noted that, when UE 906 moves from the coverage under one RRH to another, a handover procedure is required to change the association under the present embodiment. It should be noted that when UE 906 moves from the coverage of one CP beam to the coverage of another CP beam, a handover procedure is also required to change the association.

Figure 10:
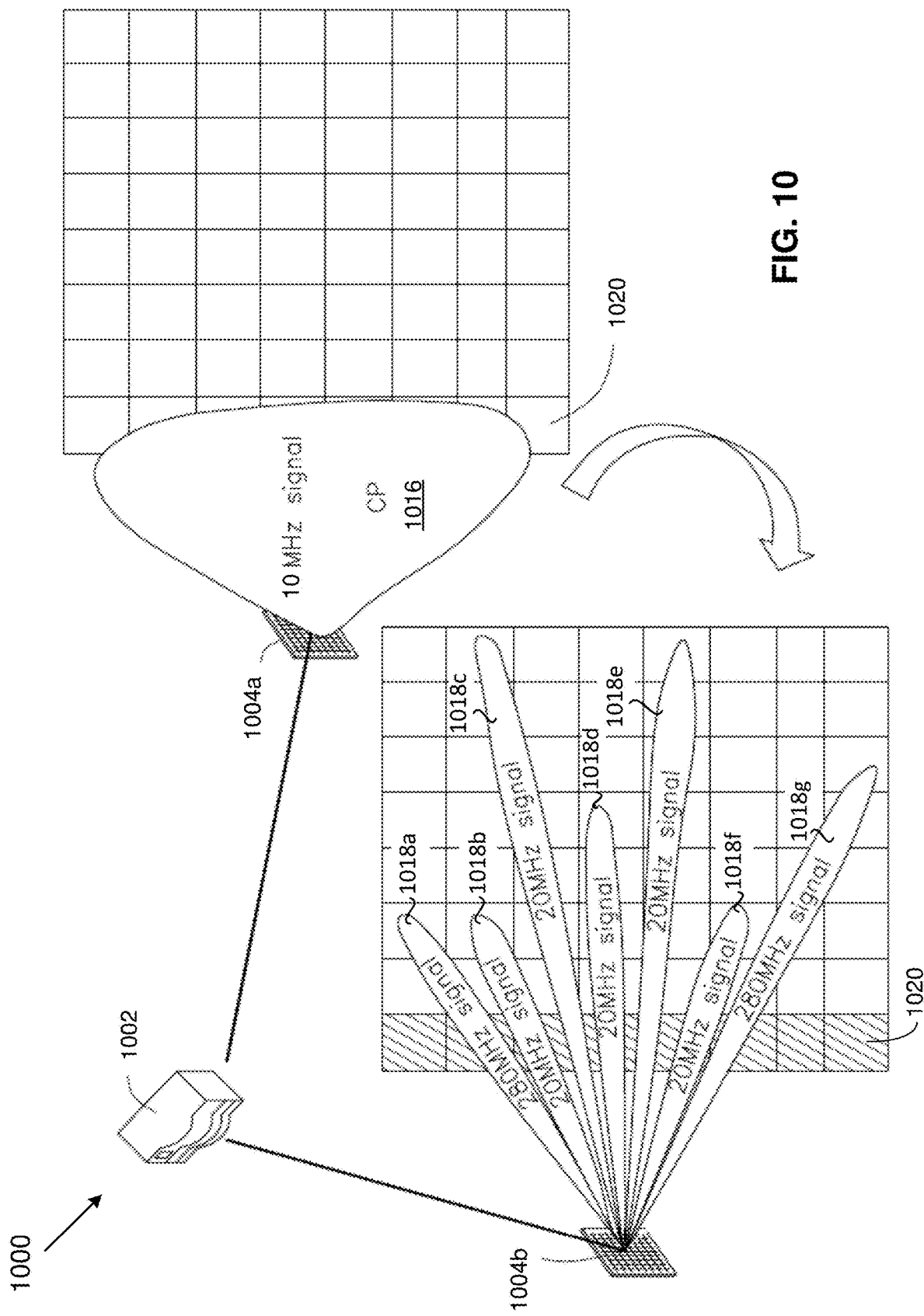
FIG. 10 is a schematic diagram of a customized C-RAN adopting a unified LBT procedure, according to an exemplary embodiment of the present application.

FIG. 10 is a schematic diagram of a customized C-RAN adopting a unified LBT procedure, according to an exemplary embodiment of the present application. In FIG. 10, customized C-RAN 1000 includes BBU 1002, CP RRH 1004a, and non-CP RRH 1004b. BBU 1002 communicates with CP RRH 1004a and non-CP RRH 1004b. In the present embodiment, CP RRH 1004a is selected and dedicated for providing CP signaling transmission, and the CP signaling information is unified/shared for all connected RRHs (including non-CP RRH 1004b) within the coverage under customized C-RAN 1000. CP RRH 1004a transmits CP signaling in unlicensed CP sub-band 1020 by using omni-directional beam-forming. Non-CP RRH 1004b is prohibited from using unlicensed CP sub-band 1020 (as depicted by the slash lines in FIG. 10). CP beam 1016 may occupy a smaller bandwidth (e.g. around 10 MHz) than the bandwidths of the UP sub-bands occupied by UP beams 1018a through 1018g (e.g., from 20-280 MHz). For example, UP beams 1018a, 1018b, 1018c, 1018d, 1018e, 1018f, and 1018g may each have their own bandwidths, for example, adjusted based on their particular serving UEs' UL/DL requirements. For example, UP beam 1018a has a bandwidth of 280 MHz, while UP beam 1018b has a bandwidth of 20 MHz. The bandwidth of each UP beam may depend on the data transmission rate required by the UE being served. CP RRH 1004a may be configured with higher transmitting power to guarantee that CP RRH 1004a's omni-directional CP beam 1016 is able to cover directional UP beams formed by all non-CP RRHs.

In the present embodiment, CP RRH 1004a is selected and dedicated for providing CP signaling transmission using omni-directional CP beam 1016, while non-CP RRH 1004b (and other non-CP RRHs under customized C-RAN 1000 not explicitly shown in FIG. 10) is selected to transmit UP content using directional UP beams 1018a through 1018g. In another embodiment, non-CP RRH 1004b may be selected and dedicated for providing CP signaling using an omni-directional CP beam, while CP RRH 1004a (and other RRHs under customized C-RAN 1000 not explicitly shown in FIG. 10) may be selected to transmit UP content using directional UP beams. BBU 1002 may be in charge of the selection, based on factors or readings of each RRH to determine which RRH is the best suitable for transmitting CP signaling.

In the present embodiment, CP beam 1016 includes all the necessary information (e.g., synchronization signaling, system information, reference signaling, and channel configuration) for all of the UP beams under all of the RRHs' coverage (including non-CP RRH 1004b). As such, all UEs in the coverage of the RRHs may synchronize with CP RRH 1004a based on CP information provided by CP beam 1016 for subsequent UP content (e.g., DL/UL) transmission through one or more UP beams 1018a, 1018b, 1018c, 1018d, 1018e, 1018f, and 1018g. That is, UP beams 1018a, 1018b, 1018c, 1018d, 1018e, 1018f, and 1018g may all rely on CP beam 1016 for providing all the necessary information for their subsequent UP data transmissions.

It should be understood that CP beam 1016's beam pattern does not need to be omni-directional. For example, CP beam 1016 may have a beam pattern (e.g., non-omni-directional beam pattern) having a beamwidth that is wider (e.g., having wider access coverage) than the beamwidths of all of the UP beams (e.g., UP beams 1018a through 1018g) under the non-CP RRHs' coverage.

In the present embodiment, since only CP RRH 1004a needs to perform LBT on CP sub-band 1020, FDM or TDM mechanism is not required for supporting multi-RRH CP signaling transmission. As such, conflict among multiple RRHs can be prevented, and spectrum efficiency can be further improved. If CP RRH 1004a fails to pass the LBT, it may try to switch to another CP sub-band (e.g., by indication or assignment from BBU 1002). BBU 1002 may request all non-CP RRHs to stop using (e.g., stop transmitting on) the newly assigned CP sub-band.

From a UE's perspective, as the UE entering the coverage of customized C-RAN 1000, the UE may read the CP information from CP RRH 1004a. The UE may camp on CP RRH 1004a. CP/mobility management is anchored at CP RRH 1004a, so that there is no handover procedure required when the UE moves from one non-CP RRH (e.g., non-CP RRH 1004b) to another non-CP RRH.

Figure 11:
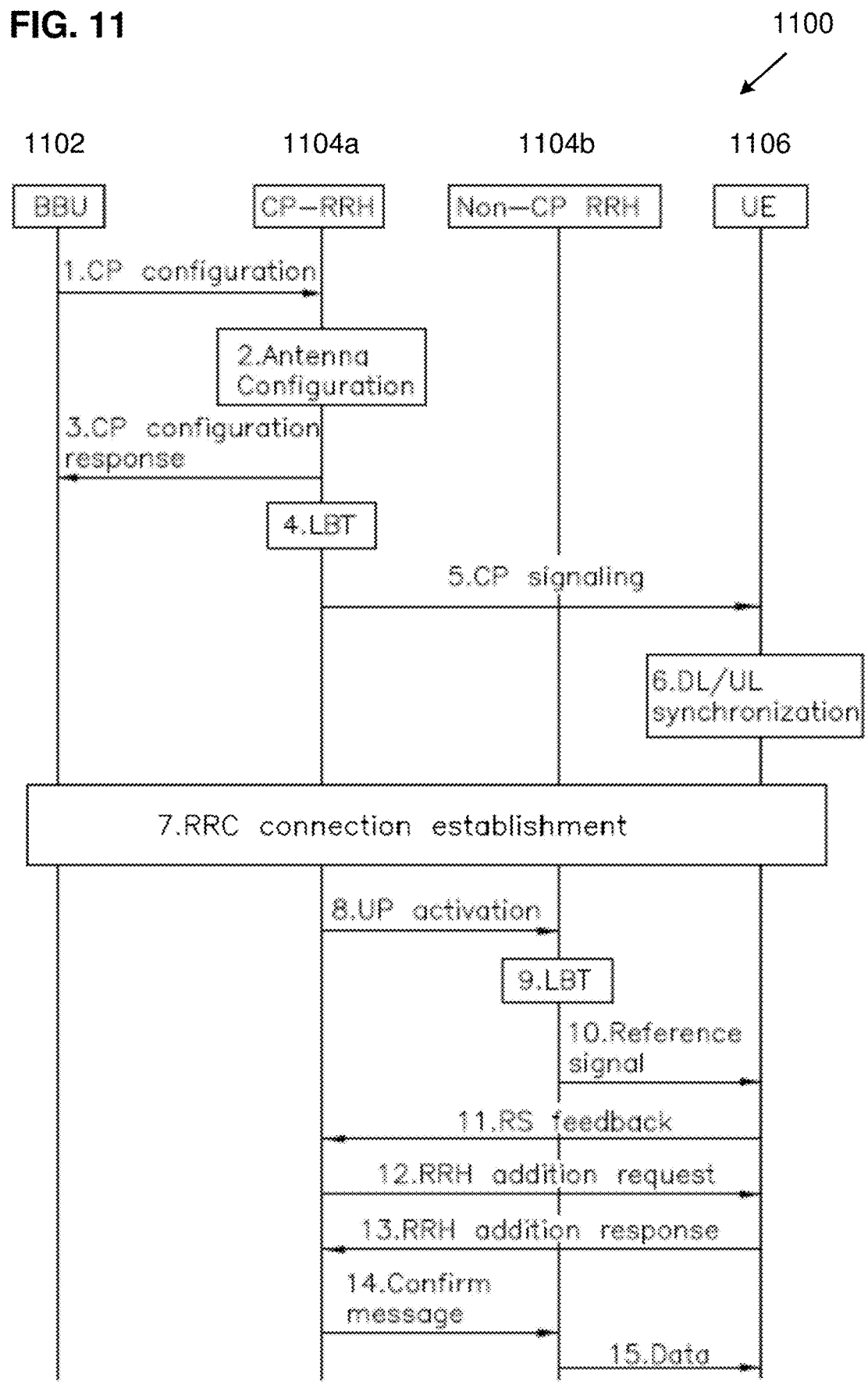
FIG. 11 is a schematic diagram illustrating an exemplary signaling procedure for a customized C-RAN adopting a unified LBT procedure, according to an exemplary embodiment of the present application.

FIG. 11 is a schematic diagram illustrating a signaling procedure for a customized C-RAN adopting a unified LBT procedure, according to an exemplary embodiment of the present application. As illustrated in FIG. 11, signaling procedure 1100 includes steps 1 through 15. Steps 1, 2, and 3 of signaling procedure 1100 are substantially similar to steps 1, 2, and 3 of signaling procedure 900 in FIG. 9, therefore omitted for brevity.

In step 4, CP RRH 1104a performs a LBT procedure, before providing any CP signaling through a CP beam in an unlicensed sub-band to make sure that the unlicensed sub-band (e.g., channel) is not occupied. In step 5, after performing LBT, if the unlicensed particular sub-band CP RRH 1104a in which attempts to transmit CP transmission is free for use (or unoccupied), CP RRH 1104a may provide CP signaling using a CP beam (e.g., CP beam 1016 in FIG. 10) that has an omni-directional beam pattern using the particular sub-band (e.g., CP sub-band 1020 in FIG. 10) by using the omni-directional beam-forming antenna configuration. For example, CP RRH 1104a broadcasts the omni-directional CP beam to all UEs under all connected RRHs (e.g., non-CP RRH 1004b in FIG. 10) within the coverage under the customized C-RAN (e.g., customized C-RAN 1000 in FIG. 10). In step 6, UE 1106 (e.g., either idle or entering the coverage of any of the connected RRHs) may acquire the CP signaling through a transceiver circuit, and perform DL/UL synchronization based on the information (e.g., synchronization signaling, system information, reference signaling, and channel configuration) contained in the CP beam. It should be noted that, UE 1106 may receive CP signaling only from CP RRH 1104a.

In step 7, once synchronization with CP RRH 1104a is accomplished, UE 1106 performs RRC connection establishment (e.g., registration/authorization, NAS negotiation) through CP RRH 1104a. UE 1106 may proceed with the legacy establishment. For example, a transferring function may be located in BBU 1102 to deal with the establishment (e.g., transferring the legacy establishment to an IP packet and forwarding directly to the Ethernet since the customized C-RAN does not connect with an EPC). As a result of step 7, an RRC connection is established among BBU 1102, CP RRH 1104a, non-CP RRH 1104b, and UE 1106. In one exemplary embodiment, non-CP RRH 1104b may broadcast synchronization signaling (without other CP signaling), and UE 1106 can synchronize with non-CP RRH 1104b by the synchronization signaling. In another exemplary embodiment, UE 1106 may take CP RRH 1104a's synchronization result as a reference (e.g., apply the same parameters) to synchronize with non-CP RRH 1104b, where CP-RRH 1104a may provide additional feedback to adjust the synchronization.

In step 8, CP RRH 1104a sends a UP activation command to non-CP RRH 1104b to initiate a directional beam-forming operation. In step 9, after receiving the UP activation command from CP RRH 1104a, non-CP RRH 1104b performs a LBT procedure, before providing any UP content through a directional UP beam, to make sure that the unlicensed sub-band (e.g., channel) is not occupied.

In step 10, after performing LBT, if the unlicensed sub-band in which non-CP RRH 1104b attempts to transmit UP transmission is free for use (or unoccupied), non-CP RRH 1104b may send a reference signal (RS) to UE 1106. It is noted the RS allocation may be configured via CP signaling. Also, different UEs may have different RSs. In step 11, UE 1106 responds with a RS feedback signal (e.g., having the results of the measurements of the RS) to CP RRH 1104a. In step 12, when CP RRH 1104a opens a directional beam-forming application for UE 1106, CP RRH 1104a sends an RRH addition request message to UE 1106, where the RRH addition request message indicates the target non-CP RRH' ID (e.g., a physical cell identifier (PCI) and the corresponding resources configuration of non-CP RRH 1104b) and/or directional beamforming beam index. In step 13, based on the result of addition, UE 1106 may send back an RRH addition response message (e.g., ACK or NACK) to CP RRH 1104a. In step 14, upon receiving the RRH addition response message (e.g., ACK) from UE 1106, CP RRH 1104a may send a confirming message to the target non-CP RRH (e.g., non-CP RRH 1104b) to initiate data transmission. In step 15, after receiving the confirming message, the target non-CP RRH (e.g., non-CP RRH 1104b) may start transmitting UP content (e.g., data) to UE 1106 via the directional beam, where the transceiver circuit of UE 1106 receives the UP content using the directional UP beam based on the CP signaling information acquired through the CP beam.

In the present embodiment, since only CP RRH 1104a needs to perform LBT before providing CP signaling, inter RRH collisions can avoided. Also, since only one sub-band is used by CP RRH 1104a to provide CP signaling, the rest of the RRHs (e.g., non-CP RRH 1104b) in the customized C-RAN are made available to provide UP content using other sub-bands in the spectrum (e.g., unlicensed spectrum). It should be noted that from UE 1106's perspective, UE 1106 may need to maintain dual connectivity with both CP RRH 1104a and non-CP RRH 1104b.

Figure 12A:
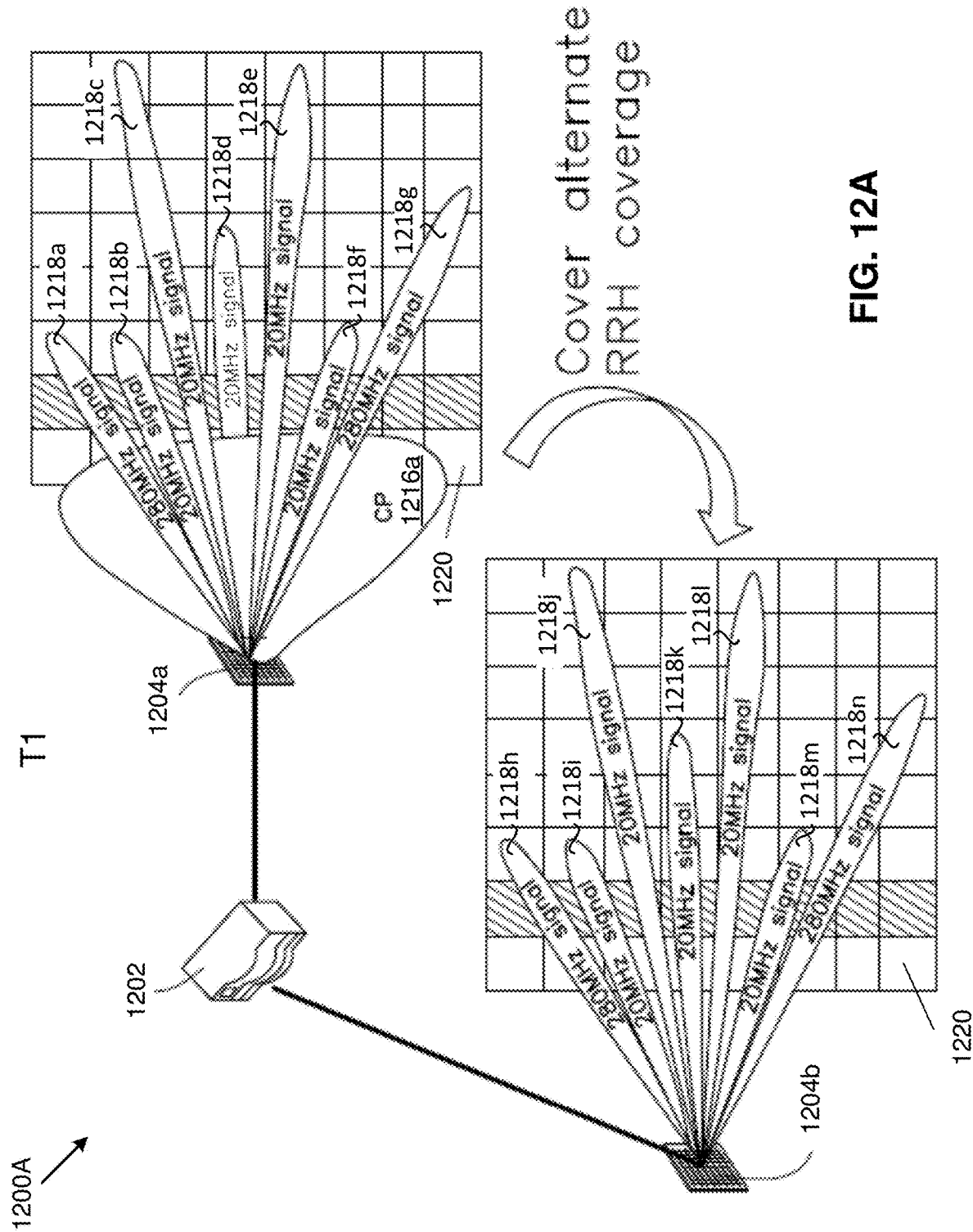
FIGS. 12A and 12B are schematic diagrams of a customized C-RAN adopting an alternated LBT procedure, according to an exemplary embodiment of the present application.
Figure 12B:
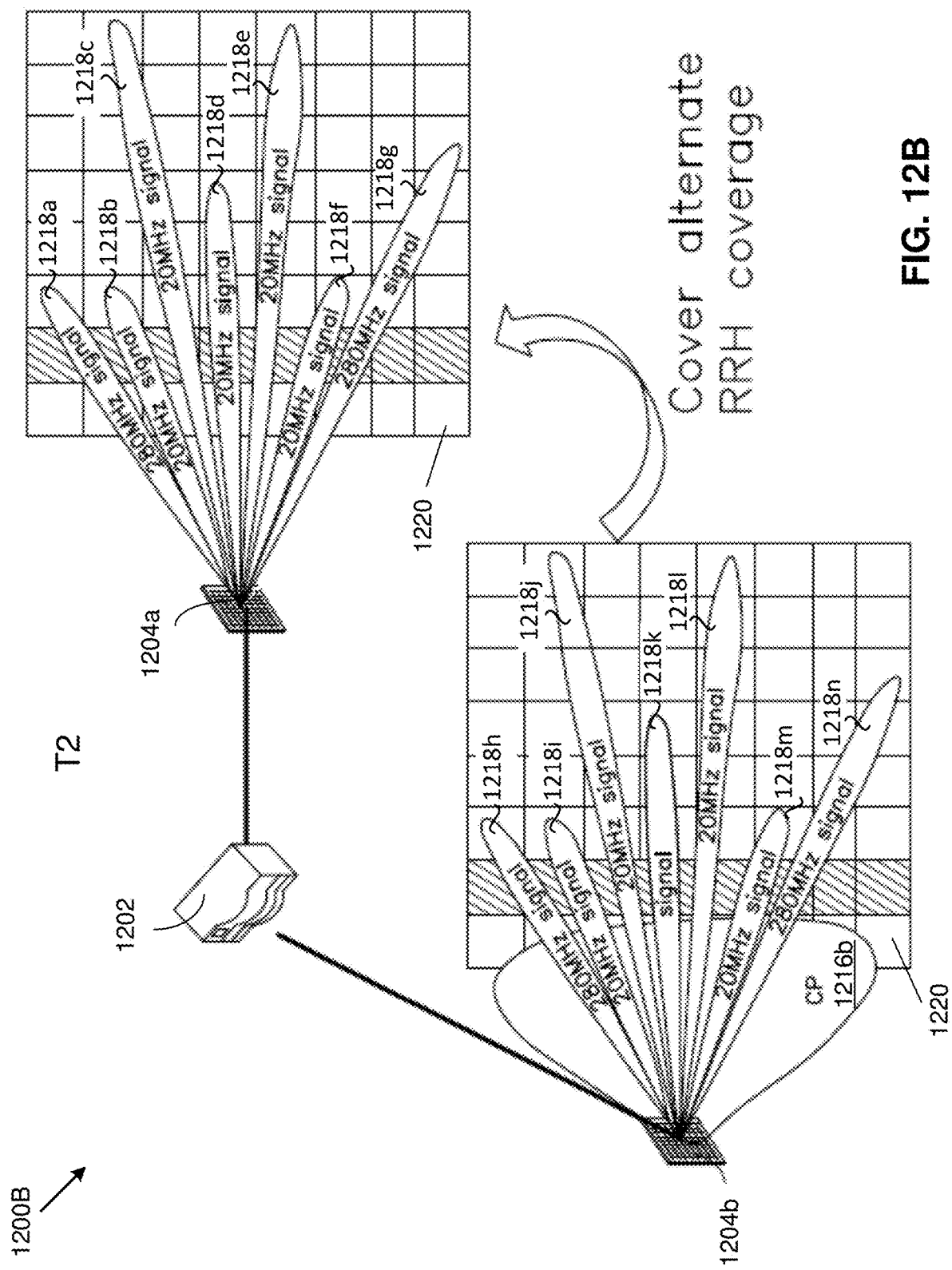

FIGS. 12A and 12B are schematic diagrams of a customized C-RAN adopting an alternated LBT procedure, according to an exemplary embodiment of the present application. In the present embodiment, customized C-RAN 1200A illustrates a customized C-RAN adopting an alternated LBT procedure during time T1, while customized C-RAN 1200B illustrates the customized C-RAN adopting the alternated LBT procedure during time T2. In both FIGS. 12A and 12B, customized C-RANs 1200A and 1200B include BBU 1202, RRH 1204a, and RRH 1204b, where BBU 1202 communicates with RRH 1204a and RRH 1204b.

During time T1, RRH 1204a is selected and dedicated for providing CP signaling, and the CP signaling information is unified/shared for all connected RRHs (including RRHs 1204a and 1204b) within the coverage under customized C-RAN 1200A. RRH 1204a transmits CP signaling in unlicensed CP sub-band 1220 by using omni-directional beam-forming. RRH 1204b is prohibited from using unlicensed CP sub-band 1220. Also, other RRHs connected to BBU 1202 are prohibited from using unlicensed CP sub-band 1220 for CP/UP transmission.

CP beam 1216a may occupy a smaller bandwidth (e.g. around 10 MHz) than the bandwidths of the UP sub-bands occupied by UP beams 1218a through 1218n (e.g., from 20-280 MHz). For example, UP beams 1218a through 1218n may each have their own bandwidths, for example, adjusted based on their particular serving UEs' UL/DL requirements. For example, UP beam 1218a has a bandwidth of 280 MHz, while UP beam 1218m has a bandwidth of 20 MHz. The bandwidth of each UP beam may depend on the data transmission rate required by the UE being served. RRH 1204a may be configured with higher transmitting power to guarantee that RRH 1204a's omni-directional CP beam 1216a is able to cover directional UP beams formed by the RRHs.

During time T1, RRH 1204a is selected and dedicated for providing CP signaling transmission using omni-directional CP beam 1216a, while RRHs 1204a and 1204b (and other RRHs under customized C-RAN 1200A not explicitly shown in FIG. 12A) are able to transmit UP content using directional UP beams 1218a through 1218n. CP beam 1216a includes all the necessary information (e.g., synchronization signaling, system information, reference signaling, and channel configuration) for all of the UP beams under all of the RRHs' coverage (including RRHs 1204a and 1204b). For example, the CP signaling information is shared (e.g., the same) for all of the RRHs. As such, during time T1, all of the UEs in the coverage of the RRHs may synchronize with RRH 1204a based on CP information provided by CP beam 1216a for subsequent UP content (e.g., DL/UL) transmission through one or more UP beams 1218a through 1218n. That is, during time T1, UP beams 1218a through 1218n all rely on CP beam 1216a for providing all the necessary information for their subsequent UP data transmissions.

It should be understood that CP beam 1216a's beam pattern does not need to be omni-directional. For example, CP beam 1216a may have a beam pattern (e.g., non-omni-directional beam pattern) having a beamwidth that is wider (e.g., having wider access coverage) than the beamwidths of all of the UP beams (e.g., UP beams 1218a through 1218n) under the RRHs' coverage.

At time T2 (i.e., immediately following the expiration of time T1), RRH 1204a releases the resources of unlicensed CP sub-band 1220 in order to comply with the LBT regulations, while RRH 1204*b* takes over unlicensed CP sub-band 1220 immediately after RRH 1204*a*'s release, and continues to broadcast the CP signaling information for all connected RRHs under customized C-RAN 1200B, using unlicensed CP sub-band 1220.

During time T2, RRH 1204*b* is selected and dedicated for providing CP signaling transmission, and the CP signaling information is unified/shared for all connected RRHs (including RRHs 1204*a* and 1204*b*) within the coverage under customized C-RAN 1200B. RRH 1204*b* transmits CP signaling in unlicensed CP sub-band 1220 by using omni-directional beam-forming. RRH 1204*a* is prohibited from using unlicensed CP sub-band 1220. Also, other RRHs connected to BBU 1202 are prohibited from using unlicensed CP sub-band 1220 for CP/UP transmission.

CP beam 1216*b* may occupy a smaller bandwidth (e.g. around 10 MHz) than the bandwidths of the UP sub-bands occupied by UP beams 1218*a* through 1218*n* (e.g., from 20-280 MHz). For example, UP beams 1218*a* through 1218*n* may each have their own bandwidths, for example, adjusted based on their particular serving UEs' UL/DL requirements. For example, UP beam 1218*a* has a bandwidth of 280 MHz, while UP beam 1218*m* has a bandwidth of 20 MHz. The bandwidth of each UP beam may depend on the data transmission rate required by the UE being served. RRH 1204*b* may be configured with higher transmitting power to guarantee that RRH 1204*b*'s omni-directional CP beam 1216*b* is able to cover directional UP beams formed by the RRHs.

During time T2, RRH 1204*b* is selected and dedicated for providing CP signaling transmission using omni-directional CP beam 1216*b*, while RRHs 1204*a* and 1204*b* (and other RRHs under customized C-RAN 1200B not explicitly shown in FIG. 12B) are able to transmit UP content using directional UP beams 1218*a* through 1218*n*. CP beam 1216*b* includes all the necessary information (e.g., synchronization signaling, system information, reference signaling, and channel configuration) for all of the UP beams under all of the RRHs' coverage (including RRHs 1204*a* and 1204*b*). As such, during time T2, all UEs in the coverage of the RRHs may synchronize with RRH 1204*b* based on CP information provided by CP beam 1216*b* for subsequent UP content (e.g., DL/UL) transmission through one or more UP beams 1218*a* through 1218*n*. That is, during time T2, UP beams 1218*a* through 1218*n* all rely on CP beam 1216*b* for providing all the necessary information for their subsequent UP data transmissions.

It should be understood that CP beam 1216*b*'s beam pattern does not need to be omni-directional. For example, CP beam 1216*b* may have a beam pattern (e.g., non-omni-directional beam pattern) having a beamwidth that is wider (e.g., having wider access coverage) than the beamwidths of all of the UP beams (e.g., UP beams 1218*a* through 1218*n*) under the RRHs' coverage.

In the present embodiment, since RRH 1204*a* and RRH 1204*b* have prior knowledge of exactly when each other's allowed time duration for occupying unlicensed CP sub-band 1220 (e.g., through BBU 1202), RRH 1204*a* and RRH 1204*b* can alternately perform LBT on unlicensed CP sub-band 1220 immediately upon the expiration of each other's allowed operation time for occupying unlicensed CP sub-band 1220. As such, RRH 1204*a* and RRH 1204*b* may together as a group continuously occupy unlicensed CP sub-band 1220 to provide CP signaling information for all of the connected RRHs under customized C-RANs 1200A and 1200B.

From a UE's perspective, the UE may treat the grouped RRHs as a single RRH (UE does not distinguish individual RRHs within the group) and perform association through the CP sub-band. Consequently, based on the results of the measurements from the UE, an appropriate RRH can transmit UP content to the UE using other sub-bands via directional beam-forming. The UE may also need to maintain dual connectivity with both RRH 1204*a* and RRH 1204*b*, and receive indications from BBU 1202 regarding when each of RRH 1204*a* and RRH 1204*b* will broadcast the CP beam.

In the present embodiment, at least two RRHs (RRHs 1204*a* and 1204*b*) are configured to perform LBT alternately in order to provide a consistent and unified CP coverage for UP content transmissions by all of the RRHs under the coverage of the customized C-RAN. For example, when a first RRH (e.g., RRH 1204*a*) in the grouped RRHs (e.g., RRHs 1204*a* and 1204*b*) needs to release the unlicensed resources subject to the LBT regulations, one of the other RRHs in the grouped RRHs (e.g., RRH 1204*b*) can perform LBT immediately upon the first RRH releasing the unlicensed resources so as to occupy the same resources. Since the exact timing of the first RRH releasing the unlicensed resources is known in advance by the other RRHs (e.g., RRH 1204*b*) in the group, one or more of the other RRHs in the groups may perform LBT immediately upon the expiration of the time period of which the first RRH is permitted to transmit CP signaling using the unlicensed sub-band. Thus, at least one of the other RRHs in the grouped RRHs may occupy the unlicensed resources, so that the grouped RRHs can continuously occupy the unlicensed sub-band as a group to provide CP signaling transmissions to all of the UEs under the customized C-RAN. Meanwhile, the CP signaling information is the same for or shared by the grouped RRHs. The coordination between the grouped RRHs may create a joint directional beam-forming pattern, such that two or more directional beam patterns may be overlapped with one another. As a result, the transmission data rate and robustness of transmission can be achieved. The RRHs can apply different levels of transmitting power to accomplish a unified coverage based on the placement of the respective RRHs.

Figure 13:
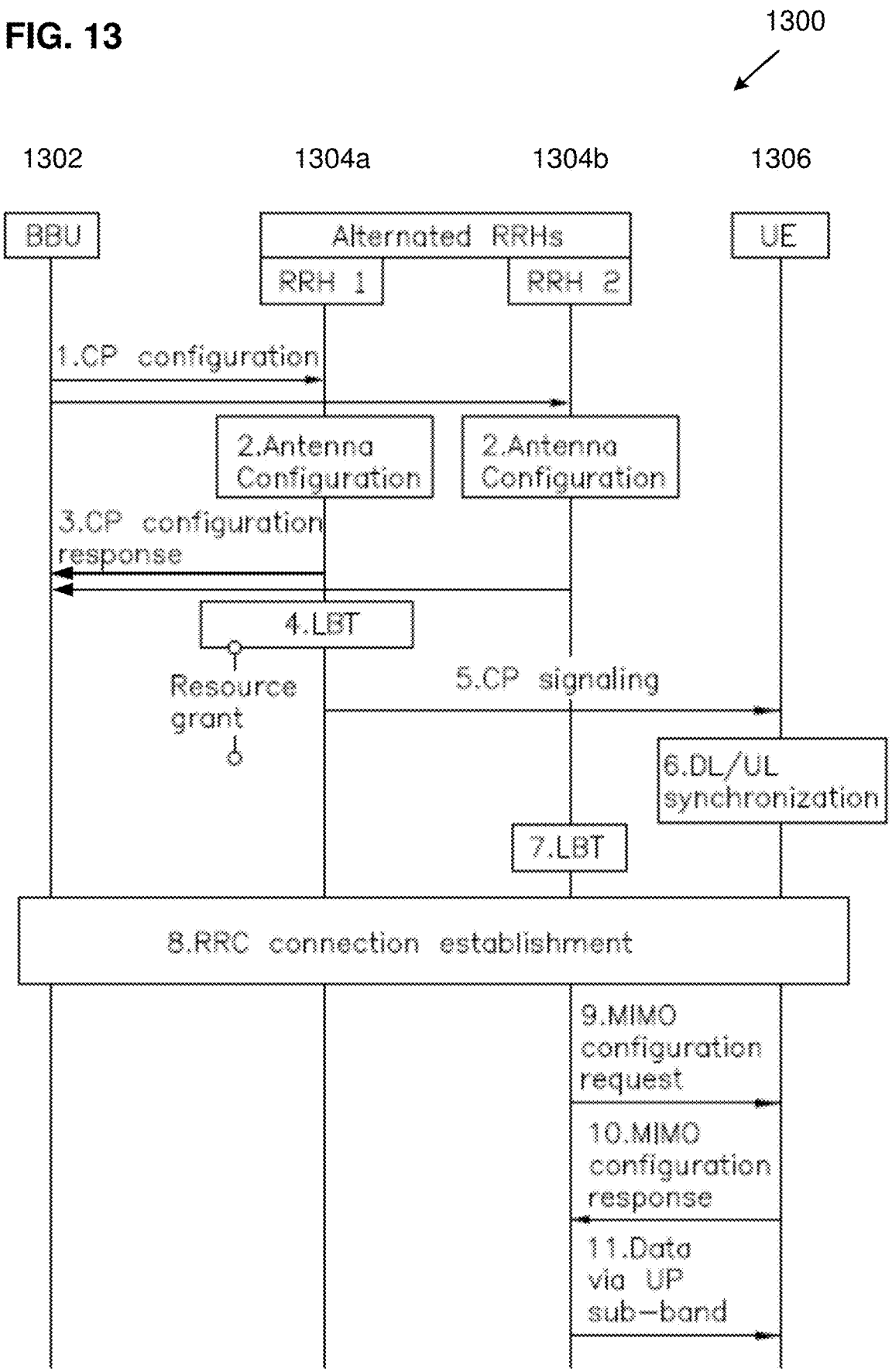
FIG. 13 is a schematic diagram illustrating an exemplary signaling procedure for a customized C-RAN adopting an alternated LBT procedure, according to an exemplary embodiment of the present application.

FIG. 13 is a schematic diagram illustrating a signaling procedure for a customized C-RAN adopting an alternated LBT procedure, according to an exemplary embodiment of the present application. As illustrated in FIG. 13, signaling procedure 1300 includes steps 1 through 11.

In step 1, BBU 1302 sends a CP configuration message to grouped RRHs (e.g., RRHs 1304*a* and 1304*b*). The CP configuration message may include an assigned CP sub-band and describe the parameters of an omni-directional beam-forming pattern (e.g. the transmitting power, the beam-forming weights, and the phase) for the CP beams to be formed by each of the grouped RRHs. In one embodiment, RRHs 1304*a* and 1304*b* may apply the same parameters to form their corresponding CP beam patterns (e.g., omni-directional beam patterns). In another embodiment, RRHs 1304*a* and 1304*b* may apply different parameters to form their corresponding CP beam patterns (e.g., omni-directional beam patterns). BBU 1302 may employ a list to provide the corresponding indications. More specifically, BBU 1302 may configure the ordering and the duration of LBT behavior for each of RRHs 1304*a* and 1304*b* in the group. BBU 1302 may also determine the identity of each member of the group. For example, BBU 1302 may perform a grouping procedure for the connected RRHs.

In step 2, after receiving the CP configuration message, RRHs 1304a and 1304b may each configure at least a portion of their antenna array based on the parameters for the requested CP beam patterns (e.g., omni-directional beam patterns) in the assigned CP sub-band. In step 3, after antenna configuration, RRHs 1304a and 1304b may each send a CP configuration response message to BBU 1302 to inform BBU 1302 about the status of the configuration (e.g., success or failure). RRHs 1304a and 1304b may further indicate the cause of failure in the CP configuration response message in order for BBU 1302 to perform re-configuration if necessary.

In step 4, during time T1, RRH 1304a may perform a LBT procedure, before providing any CP signaling through a CP beam in an unlicensed sub-band to make sure that the unlicensed sub-band (e.g., channel) is not occupied. In step 5, after performing LBT, if the unlicensed particular sub-band in which RRH 1304a attempts to transmit CP transmission is free for use (or unoccupied), RRH 1304a may provide CP signaling using a CP beam (e.g., CP beam 1216a in FIG. 12) that has an omni-directional beam pattern using the particular sub-band (e.g., CP sub-band 1220 in FIG. 12) by using the omni-directional beam-forming antenna configuration. For example, RRH 1304a may broadcast the omni-directional CP beam to all UEs under all of the grouped RRHs (e.g., RRHs 1304a and 1304b) within the coverage of the customized C-RAN (e.g., customized C-RAN 1200A in FIG. 12A).

In step 6, UE 1306 (e.g., either idle or entering the coverage of any of the connected RRHs) may acquire the CP signaling through a transceiver circuit, and perform DL/UL synchronization based on the information (e.g., synchronization signaling, system information, reference signaling, and channel configuration) contained in the CP beam. It should be noted that, UE 1306 may receive CP signaling only from RRH 1304a during time T1. In step 7, knowing the exact the expiration time of T1 (i.e., the time duration of which RRH 1304a is permitted to occupy the resources of the unlicensed sub-band pursuant to the LBT regulations), RRH 1304b may initiate a LBT procedure at the beginning of time T2, which immediately follows the expiration of time T1, to occupy the resources of the unlicensed sub-band to ensure a continuous transmission of CP signaling within the grouped RRHs. Steps 8, 9, 10, and 11 of signaling procedure 1300 are substantially similar to steps 7, 8, 9, and 10 of signaling procedure 900 in FIG. 9, respectively, thus omitted for brevity.

The customized C-RAN deployments and architectures described in the present application enable a greater degree of customization for enterprises. Among other advantages, the customized C-RANs described above may eliminate license fees for using licensed spectrum, since the CP and UP content can be provided entirely in unlicensed spectrum.

What is claimed is:

1. A method for a user equipment (UE), the method comprising:
  receiving control-plane (CP) signaling using a first beam in a radio resource, the radio resource comprising time slots and a radio spectrum having an unlicensed band;
  receiving user-plane (UP) content using a second beam in the radio resource based on the CP signaling;
  wherein a first Listen-Before-Talk (LBT) procedure is performed by a transmitter before the UE receives the CP signaling using the first beam in the radio resource;
  wherein a second LBT procedure is performed by the transmitter before the UE receives the UP signaling using the second beam in the radio resource;
  wherein the second beam has a directional beam pattern;
  wherein the first beam uses a first unlicensed sub-band of the radio spectrum, and the second beam uses a second unlicensed sub-band of the radio spectrum.

2. The method of claim 1, wherein the first beam and the second beam are millimeter-wave beams.

3. The method of claim 1, wherein the first beam has an omni-directional beam pattern.

4. The method of claim 1, wherein the first beam uses a first time slot of the radio spectrum, and the second beam uses a second time slot of the radio spectrum.

5. The method of claim 1, wherein the first LBT procedure is to check whether the first unlicensed sub-band in which the first beam is broadcast is unoccupied.

6. The method of claim 1, further comprising:
  receiving another control-plane (CP) signaling using a third beam in the radio resource;
  receiving another user-plane (UP) content using a fourth beam in the radio resource based on the another CP signaling;
  wherein the first and second beams are provided by a first RRH, and the third and fourth beams are provided by a second RRH;
  wherein the first RRH and the second RRH are coupled to a baseband unit (BBU);
  wherein the first beam and the third beam are provided using different sub-bands and/or different time slots in the radio resource.

7. The method of claim 1, wherein the CP signaling is provided by a first RRH using the first unlicensed sub-band of the radio resource, and the UP content is provided by a second RRH using the second unlicensed sub-band of the radio resource.

8. The method in claim 7, wherein the first RRH provides the CP signaling to all UP beams transmitted by the second RRH.

9. The method of claim 7, wherein the second LBT procedure is performed with the second RRH before the UE receives the UP content using the second beam in the radio resource to check whether the second unlicensed sub-band in which the second beam is transmitted is unoccupied.

10. The method of claim 1, wherein the CP signaling is received from at least two RRHs, and wherein the at least two RRHs provide the CP signaling using an unlicensed CP sub-band in different time slots.

11. The method of claim 1, wherein the CP signaling comprises at least one of synchronization signaling, system information, reference signaling, and channel configuration, and wherein the UP content comprises user data and user specific reference signaling.

12. A user equipment (UE) comprising:
  a receiver circuit configured to:
    receive control-plane (CP) signaling through a first beam in a radio resource, the radio resource comprising time slots and a radio spectrum having an unlicensed band;
    receive user-plane (UP) content using a second beam in the radio resource based on the CP signaling;
    wherein a first Listen-Before-Talk (LBT) procedure is performed by a transmitter before the UE receives the CP signaling using the first beam in the radio resource;
    wherein a second LBT procedure is performed by the transmitter before the UE receives the UP signaling using the second beam in the radio resource;
    wherein the second beam has a directional beam pattern;

wherein the first beam uses a first unlicensed sub-band of the radio spectrum, and the second beam uses a second unlicensed sub-band of the radio spectrum.

13. The UE of claim 12, wherein the first beam and the second beam are millimeter-wave beams.

14. The UE of claim 12, wherein the first beam has an omni-directional beam pattern.

15. The UE of claim 12, wherein the first beam uses a first time slot of the radio spectrum, and the second beam uses a second time slot of the radio spectrum.

16. The UE of claim 12, wherein the receiver circuit is further configured to:
   receive another control-plane (CP) signaling using a third beam in the radio resource;
   receive another user-plane (UP) content using a fourth beam in the radio resource based on the another CP signaling;
   wherein the first and second beams are provided by a first RRH, and the third and fourth beams are provided by a second RRH;
   wherein the first RRH and the second RRH are coupled to a baseband unit (BBU);
   wherein the first beam and the third beam are provided using different sub-bands and/or different time slots in the radio resource.

17. The UE of claim 12, wherein the CP signaling is provided to the UE by a first RRH using the first unlicensed sub-band of the radio resource, and the UP content is provided to the UE by a second RRH using the second unlicensed sub-band of the radio resource.

18. The UE of claim 12, wherein the CP signaling is received from at least two RRHs, and wherein the at least two RRHs provide the CP signaling using an unlicensed CP sub-band in different time slots.

19. The UE of claim 12, wherein the CP signaling comprises at least one of synchronization signaling, system information, reference signaling, and channel configuration, and wherein the UP content comprises user data and user specific reference signaling.

* * * * *